United States Patent
Urakawa

(10) Patent No.: US 9,411,610 B2
(45) Date of Patent: Aug. 9, 2016

(54) SERVER, SCREEN CONTROL METHOD, AND SCREEN TRANSITION METHOD FOR EFFECTIVELY DISPLAYING SCREENS ON A TERMINAL DEVICE

(75) Inventor: Yutaka Urakawa, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 781 days.

(21) Appl. No.: 13/288,748

(22) Filed: Nov. 3, 2011

(65) Prior Publication Data

US 2012/0113468 A1   May 10, 2012

(30) Foreign Application Priority Data

Nov. 4, 2010   (JP) ................................ 2010-247152
Oct. 31, 2011   (JP) ................................ 2011-238502

(51) Int. Cl.
 *G06F 3/12*   (2006.01)
 *G06F 9/44*   (2006.01)

(52) U.S. Cl.
 CPC .................................... *G06F 9/4445* (2013.01)

(58) Field of Classification Search
 None
 See application file for complete search history.

(56) References Cited

U.S. PATENT DOCUMENTS

| 2009/0228813 | A1 | 9/2009 | Sekiguchi | |
| 2011/0047476 | A1* | 2/2011 | Hochmuth et al. | 715/744 |
| 2011/0078621 | A1* | 3/2011 | Kanda | 715/783 |
| 2012/0113469 | A1 | 5/2012 | Urakawa | |

FOREIGN PATENT DOCUMENTS

| JP | H11-212914 A | 8/1999 |
| JP | 2003-333538 A | 11/2003 |
| JP | 2004-259070 A | 9/2004 |
| JP | 2006-340204 A | 12/2006 |
| JP | 2009-207872 A | 9/2009 |

OTHER PUBLICATIONS

European Patent Office, European Search Report for European Patent Application No. 11187734.6 (counterpart to above-captioned patent application), dated Mar. 16, 2012.
Dunkel, Jurgen, et al., "Model-Driven Architecture for Mobile Applications," Business Information Systems [Lecture Notes in Computer Science], Apr. 25, 2007, pp. 464-477, Springer Berlin Heidelberg, ISBN 978-3-540-72034-8 (concise explanation of relevance provided in attached European Search Report).

* cited by examiner

Primary Examiner — John Wallace
(74) Attorney, Agent, or Firm — Merchant & Gould P.C.

(57) ABSTRACT

A terminal device, a server, a screen control method, a screen transition method, and a compute program are provided. The terminal device includes a display unit, plural operation units, a storage unit, and a control unit, and communicates with a server for making a transition of a screen on the display unit. The storage unit stores template information associating an operation unit with a transition instruction for instructing screen transition. The control unit receives instruction information representing any of transition instructions, from the server, and validates an operation unit associated with a transition instruction represented by the received instruction information and transmits operation information representing that the validated operation unit is operated, to the server. The control unit receives new instruction information transmitted from the server, and validates an operation unit associated with a transition instruction represented by the new instruction information.

17 Claims, 18 Drawing Sheets

FIG. 3A

```
UNIQUE NUMBER: 001
  INSTRUCTION TYPE: UI INSTRUCTION
UI INSTRUCTION INFORMATION
  SCREEN TYPE: LIST
  TITLE: "PLEASE SELECT WHETHER TO USE EXTERNAL SERVICE OR
  FUNCTION OF DEVICE"
  ENTER KEY: VALID PREVIOUS KEY: VALID NEXT KEY: INVALID
  UNIQUE LIST INFORMATION :
    LIST: "EXTERNAL SERVICE", "FUNCTION OF DEVICE"
    SELECTION METHOD, "SELECTION OF ONE CHOICE"
```

FIG. 3B

```
UNIQUE NUMBER: 002
  INSTRUCTION TYPE: UI INSTRUCTION
UI INSTRUCTION INFORMATION
  SCREEN TYPE: LIST
  TITLE: "DO YOU WANT TO USE EXTERNAL SERVICE?"
  ENTER KEY: VALID PREVIOUS KEY: INVALID NEXT KEY: INVALID
  UNIQUE LIST INFORMATION :
    LIST: "YES", "NO"
    SELECTION METHOD, "SELECTION OF ONE CHOICE"
```

FIG. 3C

```
UNIQUE NUMBER: 003
  INSTRUCTION TYPE: UI INSTRUCTION
UI INSTRUCTION INFORMATION
  SCREEN TYPE: LIST
  TITLE: "PLEASE SELECT SERVICE"
  ENTER KEY: VALID PREVIOUS KEY: INVALID NEXT KEY: INVALID
  UNIQUE LIST INFORMATION :
    LIST: "SERVICE A", "SERVICE B"
    SELECTION METHOD, "SELECTION OF ONE CHOICE"
```

FIG. 3D

```
UNIQUE NUMBER: 004
  INSTRUCTION TYPE: UI INSTRUCTION
UI INSTRUCTION INFORMATION
  SCREEN TYPE: LIST
  TITLE: "PLEASE SELECT UPLOAD OR DOWNLOAD"
  ENTER KEY: VALID PREVIOUS KEY: VALID NEXT KEY: INVALID
  UNIQUE LIST INFORMATION :
    LIST: "UPLOAD", "DOWNLOAD"
    SELECTION METHOD, "SELECTION OF ONE CHOICE"
```

FIG. 3E

```
UNIQUE NUMBER: 005
  INSTRUCTION TYPE: UI INSTRUCTION
UI INSTRUCTION INFORMATION
  SCREEN TYPE: MESSAGE
  TITLE: "UPLOAD SERVICE"
  ENTER KEY: INVALID  PREVIOUS KEY: INVALID NEXT KEY: VALID
  UNIQUE MESSAGE INFORMATION :
    MESSAGE: "DO YOU WANT TO USE UPLOAD?"
```

FIG. 3F

```
UNIQUE NUMBER: 006
  INSTRUCTION TYPE: UI INSTRUCTION
UI INSTRUCTION INFORMATION
  SCREEN TYPE: LIST
  TITLE: "PLEASE SELECT WHETHER TO STORE IMAGE DATA IN MEDIUM OR
  TO PRINT IMAGE DATA"
  ENTER KEY: VALID PREVIOUS KEY: VALID NEXT KEY: INVALID
  UNIQUE LIST INFORMATION :
    LIST: "STORE IMAGE DATA IN MEDIUM", "PRINT"
    SELECTION METHOD, "SELECTION OF ONE CHOICE"
```

FIG. 3G

```
UNIQUE NUMBER: 007
  INSTRUCTION TYPE: UI INSTRUCTION
UI INSTRUCTION INFORMATION
  SCREEN TYPE: LIST
  TITLE: "PLEASE SELECT IMAGE DATA"
  ENTER KEY: VALID PREVIOUS KEY: VALID NEXT KEY: INVALID
  UNIQUE LIST INFORMATION :
    (LIST: SETTING INFORMATION "LIST OF DATA NAMES OF IMAGE DATA")
    (IMAGE LIST: SETTING INFORMATION "LIST OF THUMBNAILS OF IMAGE DATA")
    SELECTION METHOD, "SELECTION OF ONE OR MORE CHOICES"
```

FIG. 3H

```
UNIQUE NUMBER: 008
  INSTRUCTION TYPE: UI INSTRUCTION
UI INSTRUCTION INFORMATION
  SCREEN TYPE: MESSAGE
  TITLE: "SERVER ERROR"
  ENTER KEY: VALID PREVIOUS KEY: VALID NEXT KEY: INVALID
  UNIQUE MESSAGE INFORMATION :
    (MESSAGE: SETTING INFORMATION "IDENTIFICATION INFORMATION OF ERROR")
```

FIG. 3I

UNIQUE NUMBER: 009
  INSTRUCTION TYPE: FUNCTION OPERATION INSTRUCTION
FUNCTION OPERATION INSTRUCTION INFORMATION :
  OPERATION TYPE: DOWNLOAD
  (PARAMETER: SETTING INFORMATION "DATA NAMES OF IMAGE DATA")
  (PARAMETER: VALUE OF SETTING INFORMATION "STORING-IN-MEDIUM/PRINTING")

FIG. 3J

UNIQUE NUMBER: 010
  INSTRUCTION TYPE: UI INSTRUCTION
UI INSTRUCTION INFORMATION
  SCREEN TYPE: LIST
  TITLE: "PLEASE SELECT WHETHER TO READ MEDIUM OR TO EXECUTE SCANNING"
  ENTER KEY: VALID PREVIOUS KEY: VALID NEXT KEY: INVALID
  UNIQUE LIST INFORMATION :
    LIST: "READ MEDIUM", "SCANNING"
    SELECTION METHOD, "SELECTION OF ONE CHOICE"

FIG. 3K

UNIQUE NUMBER: 011
  INSTRUCTION TYPE: FUNCTION OPERATION INSTRUCTION
FUNCTION OPERATION INSTRUCTION INFORMATION :
  OPERATION TYPE: UPLOAD
  (PARAMETER: VALUE OF SETTING INFORMATION "READING-OF-MEDIUM/SCANNING")

FIG. 3L

UNIQUE NUMBER: 012
  INSTRUCTION TYPE: UI INSTRUCTION
UI INSTRUCTION INFORMATION
  SCREEN TYPE: LIST
  TITLE: "PLEASE SELECT FUNCTION"
  ENTER KEY: VALID PREVIOUS KEY: VALID NEXT KEY: INVALID
  UNIQUE LIST INFORMATION :
    LIST: "SCANNING", "COPYING"
    SELECTION METHOD, "SELECTION OF ONE CHOICE"

FIG. 3M

```
UNIQUE NUMBER: 013
  INSTRUCTION TYPE: UI INSTRUCTION
UI INSTRUCTION INFORMATION
  SCREEN TYPE: INPUT BOX
  TITLE: "COPY RESOLUTION"
  ENTER KEY: VALID  PREVIOUS KEY: VALID  NEXT KEY: VALID
  UNIQUE INPUT BOX INFORMATION :
    INITIAL VALUE FOR INPUT BOX: "200"
    CHARACTERS CAPABLE OF BEING INPUT: NUMERICAL VALUES
    MAXIMUM NUMBER OF CHARACTERS: 3, MINIMUM NUMBER OF CHARACTERS: 3
```

FIG. 3N

```
UNIQUE NUMBER: 014
  INSTRUCTION TYPE: UI INSTRUCTION
UI INSTRUCTION INFORMATION
  SCREEN TYPE: LIST
  TITLE: "DO YOU WANT TO START COPYING?"
  ENTER KEY: VALID  PREVIOUS KEY: INVALID  NEXT KEY: INVALID
  UNIQUE LIST INFORMATION :
    LIST: "YES", "NO"
    SELECTION METHOD, "SELECTION OF ONE CHOICE"
```

FIG. 3O

```
UNIQUE NUMBER: 015
  INSTRUCTION TYPE: FUNCTION OPERATION INSTRUCTION
FUNCTION OPERATION INSTRUCTION INFORMATION :
  OPERATION TYPE: COPYING
  (PARAMETER: VALUE OF SETTING INFORMATION "COPY RESOLUTION")
```

FIG. 4A  SCREEN TYPE: LIST (TEXT LIST)

| PLEASE SELECT SERVICE | | ENTER |
|---|---|---|
| SERVICE A | | △ |
| SERVICE B | | |
| | | ▽ |

FIG. 4B  SCREEN TYPE: LIST (IMAGE LIST)

| PLEASE SELECT IMAGE DATA | PREVIOUS | | ENTER |
|---|---|---|---|
| ○ FIRST FILE NAME | × SECOND FILE NAME | △ THIRD FILE NAME | □ FOURTH FILE NAME |

(with △ / ▽ scroll buttons on the right)

FIG. 4C  SCREEN TYPE: MESSAGE

| SERVER ERROR | NEXT | |
|---|---|---|
| COMMUNICATION WITH SERVER HAS FAILED | | |

FIG. 4D  SCREEN TYPE: INPUT BOX

| COPY RESOLUTION | | | PREVIOUS | NEXT | ENTER |
|---|---|---|---|---|---|

| 200 | 1 | 2 | 3 | 4 | 5 |
| ← → | 6 | 7 | 8 | 9 | 0 |
| CLEAR | | | | | |

| TEMPLATE INFORMATION | TOUCH PANEL MODEL | NON-TOUCH-PANEL MODEL |
|---|---|---|
| BASIC SCREEN INFORMATION | · INFORMATION REPRESENTING WHICH OF 'LIST' SCREEN, 'INPUT BOX' SCREEN, AND 'MESSAGE' SCREEN<br>· BASIC SCREEN INFORMATION OF EACH OF 'LIST' SCREEN, 'INPUT BOX' SCREEN, AND 'MESSAGE' SCREEN (BITMAP INFORMATION) | · INFORMATION REPRESENTING WHICH OF 'LIST' SCREEN, 'INPUT BOX' SCREEN, AND 'MESSAGE' SCREEN<br>· BASIC SCREEN INFORMATION OF EACH OF 'LIST' SCREEN, 'INPUT BOX' SCREEN, AND 'MESSAGE' SCREEN (BITMAP INFORMATION) |
| OPERATION KEY INFORMATION | · INFORMATION REPRESENTING WHETHER MULTI-FUNCTION DEVICE IS TOUCH PANEL MODEL OR NON-TOUCH-PANEL MODEL<br>· BITMAP INFORMATION REPRESENTING EACH KEY ASSOCIATED WITH OPERATION OF EACH OF 'ENTER' KEY, 'PREVIOUS' KEY, AND 'NEXT' KEY<br>· INFORMATION REPRESENTING POSITION OF EACH KEY<br>· INFORMATION REPRESENTING POSITION OF TITLE | · INFORMATION REPRESENTING WHETHER MULTI-FUNCTION DEVICE IS TOUCH PANEL MODEL OR NON-TOUCH-PANEL MODEL<br>· INFORMATION REPRESENTING WHICH HARD KEY IS ASSOCIATED WITH OPERATION OF EACH OF 'ENTER' KEY, 'PREVIOUS' KEY, AND 'NEXT' KEY<br>· INFORMATION REPRESENTING WHETHER TO LIGHT UP HARD KEYS CORRESPONDING TO 'ENTER' KEY, 'PREVIOUS' KEY, AND 'NEXT' KEY<br>· INFORMATION REPRESENTING POSITION OF TITLE |

FIG. 6B

| UNIQUE SCREEN TYPE INFORMATION | LIST | · INFORMATION REPRESENTING WHAT IS UNIQUE KEY ('↑(UP)' KEY AND '↓(DOWN)' KEY)<br>· BITMAP INFORMATION REPRESENTING '↑(UP)' KEY AND '↓(DOWN)' KEY<br>· INFORMATION REPRESENTING POSITIONS OF '↑(UP)' KEY AND '↓(DOWN)' KEY | · INFORMATION REPRESENTING WHAT IS UNIQUE KEY ('↑(UP)' KEY '↓(DOWN)' KEY AND ITEM SELECTION KEY)<br>· INFORMATION REPRESENTING POSITIONS OF SELECTION CHOICES<br>· INFORMATION REPRESENTING WHICH HARD KEY IS ASSOCIATED WITH OPERATION OF EACH OF '↑(UP)' KEY, '↓(DOWN)' KEY, AND ITEM SELECTION KEY<br>· INFORMATION REPRESENTING WHETHER TO LIGHT UP HARD KEYS CORRESPONDING TO '↑(UP)' KEY, '↓(DOWN)' KEY, AND ITEM SELECTION KEY |
|---|---|---|---|
| | INPUT BOX | · INFORMATION REPRESENTING WHAT IS UNIQUE KEY ('←(LEFT ARROW)' KEY, '→(RIGHT ARROW)' KEY, 'CLEAR' KEY, AND CHARACTER KEYS (FOR EXAMPLE, NUMERICAL KEYS OF 0 TO 9))<br>· BITMAP INFORMATION REPRESENTING '←(LEFT ARROW)' KEY, '→(RIGHT ARROW)' KEY, 'CLEAR' KEY, AND CHARACTER KEYS<br>· INFORMATION REPRESENTING POSITIONS OF '←(LEFT ARROW)' KEY, '→(RIGHT ARROW)' KEY, 'CLEAR' KEY, AND CHARACTER KEYS | · INFORMATION REPRESENTING WHAT IS UNIQUE KEY ('←(LEFT ARROW)' KEY, '→(RIGHT ARROW)' KEY, 'CLEAR' KEY, CHARACTER KEYS (FOR EXAMPLE, NUMERICAL KEYS OF 0 TO 9), AND NUMBER SELECTION KEY<br>· BITMAP INFORMATION REPRESENTING CHARACTER KEYS<br>· INFORMATION REPRESENTING POSITIONS OF CHARACTER KEYS<br>· INFORMATION REPRESENTING WHICH HARD KEY IS ASSOCIATED WITH OPERATION OF EACH OF '←(LEFT ARROW)' KEY, '→(RIGHT ARROW)' KEY, 'CLEAR' KEY, AND NUMBER SELECTION KEY<br>· INFORMATION REPRESENTING WHETHER TO LIGHT UP HARD KEYS CORRESPONDING '←(LEFT ARROW)' KEY, '→(RIGHT ARROW)' KEY, 'CLEAR' KEY, AND NUMBER SELECTION KEY |
| | MESSAGE | — | — |

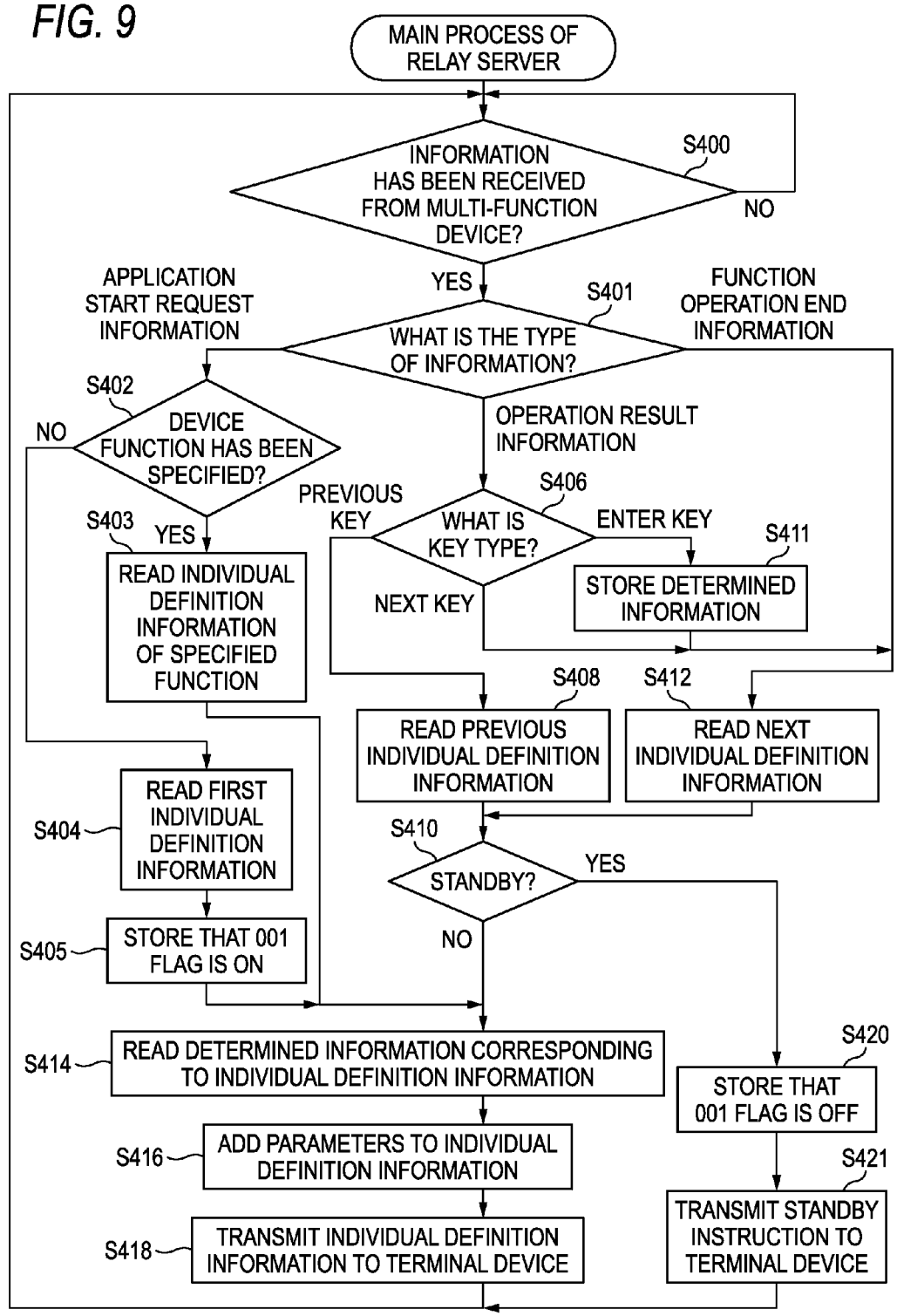

FIG. 10A

```
TREE INFORMATION
  UNIQUE NUMBER : PREVIOUS           : NEXT
  ------------------------------------------------------
  001            : STANDBY            : UNDETERMINED 001B
  002            : -                  : UNDETERMINED 002B
  003            : -                  : UNDETERMINED 003B
  004            : 003                : 006
  005            : 003                : 010
  006            : UNDETERMINED 006A  : UNDETERMINED 006B
  007            : 006                : 009
  008            : -                  : 003
  009            : -                  : STANDBY
  010            : 005                : UNDETERMINED 010B
  011            : -                  : STANDBY
  012            : 001                : UNDETERMINED 012B
  013            : UNDETERMINED 013A  : 014
  014            : 014                : 015
  015            : -                  : STANDBY
```

FIG. 10B

```
UNDETERMINED TABLE
  UNIQUE NUMBER : DETERMINATION
  ------------------------------------------------------
  001B          : 001 = EXTERNAL SERVICE → 002
                  001 = DEVICE FUNCTION → 012
  002B          : 002 = YES → 003
                  002 = NO → 001
  003B          : 003 = SERVICE A → 004
                  003 = SERVICE B → 005
  006A          : 003 = SERVICE A → 004
                  003 = SERVICE B → 005
  006B          : CASE WHERE ACQUISITION OF THUMBNAILS AND DATA
                  NAMES IN SERVICE REPRESENTED BY 003 ENDS
                  NORMALLY→ 007
                  CASE WHERE ACQUISITION OF THUMBNAILS AND DATA
                  NAMES IN SERVICE REPRESENTED BY 003 ENDS
                  ERRONEOUSLY→ 008
  010B          : CASE WHERE UPLOAD REQUEST IN SERVICE
                  REPRESENTED BY 003 ENDS NORMALLY→ 011
                  CASE WHERE UPLOAD REQUEST IN SERVICE
                  REPRESENTED BY 003 ENDS ERRONEOUSLY→ 008
  012B          : 012 = COPYING → 013
                  012 = SCANNING → ···
  013A          : 001FLAG = ON → 001
                  001FLAG = OFF → STANDBY
```

FIG. 11A

| FIRST MAPPING TABLE | |
|---|---|
| UNIQUE NUMBER | ITEM |
| 001 | EXTERNAL SERVICE/DEVICE FUNCTION, 001 FLAG |
| 002 | YES/NO |
| 003 | IDENTIFICATION INFORMATION OF SERVICE |
| 004 | UPLOAD/DOWNLOAD |
| 005 | UPLOAD |
| 006 | STORING-IN-MEDIUM/PRINTING |
| 007 | DATA NAME OF IMAGE DATA/ CANCEL |
| 008 | NONE |
| 009 | NONE |
| 010 | READING-FROM-MEDIUM/SCANNING |
| 011 | NONE |
| 012 | NONE |
| 013 | COPY RESOLUTION |
| 014 | YES/NO |
| 015 | NONE |

FIG. 11B

| SECOND MAPPING TABLE | |
|---|---|
| UNIQUE NUMBER | ITEM |
| 001 | NONE |
| 002 | NONE |
| 003 | NONE |
| 004 | NONE |
| 005 | NONE |
| 006 | NONE |
| 007 | LIST OF THUMBNAILS OF IMAGE DATA, LIST OF DATA NAMES OF IMAGE DATA |
| 008 | IDENTIFICATION INFORMATION OF ERROR |
| 009 | DATA NAMES OF IMAGE DATA, STORING-IN-MEDIUM/PRINTING |
| 010 | NONE |
| 011 | READING-FROM-MEDIUM/SCANNING |
| 012 | NONE |
| 013 | NONE |
| 014 | NONE |
| 015 | COPY RESOLUTION |

FIG. 12

| SETTING INFORMATION TABLE | |
|---|---|
| SETTING ITEM | : SETTING INFORMATION |
| EXTERNAL SERVICE/DEVICE FUNCTION | : EXTERNAL SERVICE |
| 001 FLAG | : ON |
| IDENTIFICATION INFORMATION OF SERVICE/ IDENTIFICATION INFORMATION OF FUNCTION | : SERVICE A |
| UPLOAD/DOWNLOAD | : DOWNLOAD |
| STORING-IN-MEDIUM/PRINTING/READING-FROM-MEDIUM/SCANNING | : PRINTING |
| DATA NAME OF IMAGE DATA | : FILES 1 AND 2 |
| COPY RESOLUTION | : 300 dpi |
| YES/NO | : YES |
| IDENTIFICATION INFORMATION OF ERROR | : NO ERROR |
| LIST OF PROCESSES WHICH SERVICE A PROVIDES | : UPLOAD, DOWNLOAD |
| LIST OF PROCESSES WHICH SERVICE B PROVIDES | : UPLOAD |
| LIST OF THUMBNAILS OF IMAGE DATA | : THUMBNAILS 1, 2, 3, 4... |
| LIST OF DATA NAMES OF IMAGE DATA | : FILE NAMES 1, 2, 3, 4 ... |

FIG. 13

```
UNIQUE NUMBER           : 003
  INSTRUCTION TYPE      : UI INSTRUCTION
UI INSTRUCTION INFORMATION
  SCREEN TYPE           : LIST
  TITLE                 : "SERVICE SELECTION"
  ENTER KEY             : VALID PREVIOUS KEY: INVALID
                          NEXT KEY: INVALID
  UNIQUE LIST INFORMATION
    LIST                : "SERVICE A", "SERVICE B", ("SERVICE C")
    SELECTION METHOD    : SELECTION OF ONE CHOICE
```

FIG. 14

```
UNDETERMINED TABLE
  UNIQUE NUMBER : DETERMINATION
-----------------------------------------------------------------
  001B            : 001 = EXTERNAL SERVICE → 002
                    001 = DEVICE FUNCTION → 012
  002B            : 002 = YES → 003
                    002 = NO → 001
  003B            : 003 = SERVICE A → 004
                    003 = SERVICE B → 005
                    (003 = SERVICE C → 004)
  006A            : 003 = SERVICE A → 004
                    003 = SERVICE B → 005
                    (003 = SERVICE C → 004)
  006B            : CASE WHERE ACQUISITION OF THUMBNAILS AND DATA
                    NAMES IN SERVICE REPRESENTED BY 003 ENDS
                    NORMALLY→ 007
                    CASE WHERE ACQUISITION OF THUMBNAILS AND DATA
                    NAMES IN SERVICE REPRESENTED BY 003 ENDS
                    ERRONEOUSLY→ 008
  010B            : CASE WHERE UPLOAD REQUEST IN SERVICE
                    REPRESENTED BY 003 ENDS NORMALLY→ 011
                    CASE WHERE UPLOAD REQUEST IN SERVICE
                    REPRESENTED BY 003 ENDS ERRONEOUSLY→ 008
  012B            : 012 = COPYING → 013
                    012 = SCANNING → ···
  013A            : 001FLAG = ON → 001
                    001FLAG = OFF → STANDBY
```

FIG. 15

```
SETTING INFORMATION TABLE
  SETTING ITEM                                  :  SETTING INFORMATION
  ---------------------------------------------------------------------
  EXTERNAL SERVICE/DEVICE FUNCTION              :  EXTERNAL SERVICE
  001 FLAG                                      :  ON
  IDENTIFICATION INFORMATION OF SERVICE/        :  SERVICE A
  IDENTIFICATION INFORMATION OF FUNCTION
  UPLOAD/DOWNLOAD                               :  DOWNLOAD
  STORING-IN-MEDIUM/PRINTING/READING-           :  PRINTING
  FROM-MEDIUM/SCANNING
  DATA NAME OF IMAGE DATA                       :  FILES 1 AND 2
  COPY RESOLUTION                               :  300 dpi
  YES/NO                                        :  YES
  IDENTIFICATION INFORMATION OF ERROR           :  NO ERROR LIST OF PROCESSES WHICH SERVICE A PROVIDES    :  UPLOAD, DOWNLOAD
  LIST OF PROCESSES WHICH SERVICE B PROVIDES    :  UPLOAD
  LIST OF PROCESSES WHICH SERVICE C PROVIDES    :  UPLOAD, DOWNLOAD
  LIST OF THUMBNAILS OF IMAGE DATA              :  THUMBNAILS 1, 2, 3, 4...
  LIST OF DATA NAMES OF IMAGE DATA              :  FILE NAMES 1, 2, 3, 4 ...
```

SERVER, SCREEN CONTROL METHOD, AND SCREEN TRANSITION METHOD FOR EFFECTIVELY DISPLAYING SCREENS ON A TERMINAL DEVICE

CROSS-REFERENCE TO RELATED APPLICATION

This application claims priority from Japanese Patent Application No. 2010-247152, filed on Nov. 4, 2010, and Japanese Patent Application No. 2011-238502, filed on Oct. 31, 2011, the entire subject matters of which are incorporated herein by reference.

TECHNICAL FIELD

Aspects of the present invention relate to a terminal device, a server, a screen control method, a screen transition method, and a compute program for making transitions of a screen of a display unit according to transition instructions from a server.

BACKGROUND

There have been proposed technique for displaying predetermined screens on a display of a terminal device (see, for example, JP-A-H11-212914 and JP-A-2009-207872). JP-A-H11-212914 describes an on-line business processing system which accesses a host computer to perform a business process. In the on-line business processing system, output logical information and output control information are output from an on-line business program installed in the host computer. Then, based on the output information, hypertext combined with a pre-stored hypertext template is transmitted from the host computer to a browser. Based on the hypertext, data is displayed on the browser.

JP-A-2009-207872 describes a medical control system that displays a screen for controlling a medical device on a controller. In the medical control system, the controller receives GUI setting information from the medical device. The GUI setting information is text data (GUI screen parameter information) generated for forming each of components of a GUI screen. The controller analyzes the GUI setting information so as to generate component images, combines the component images so as to form the GUI image, and displays the GUI image. Also, there is described that the controller may store template information on a plurality of graphics in advance, and adjust the sizes or positions of the graphics based on the GUI screen parameter information.

SUMMARY

For example, in a case of attempting to receive a desired service with a terminal device through a network such as the Internet, the terminal device displays a plurality of screens for appropriately inputting information and the like necessary for receiving the service, on a display unit. A user performs input operations according to the displayed screens a plurality of times. On the occasion of input operations, image data representing the plurality of screens to be displayed should be transmitted to the terminal device through the network, or should be stored in the terminal device in advance. However, in a configuration in which all of the image data representing the plurality of screens to be displayed is transmitted to the terminal device through the network, a time period until screens are displayed may become longer due to a communication rate. On the other hand, in a configuration in which all of the image data representing the plurality of screens to be displayed is stored in the terminal device in advance, when a new service is additionally provided by a service providing server, the terminal device has no image data regarding the new service. Therefore, whenever a service is added, image data regarding the new service should be additionally stored in a large number of terminal devices capable of communication with the network. Further, when it is required to additionally store the image data, it may be required to additionally store a program for managing screen transitions regarding the new service in a large number of terminal devices capable of communication with the network.

An aspect of the present invention provides a terminal device, a server, a screen control method, a screen transition method, and a computer program which are capable of reducing a communication load between devices during information communication regarding screen display, and effectively displaying screens regarding an extended function such as a newly added service.

According to an illustrative embodiment of the present invention, there is provided a terminal device configured to perform communication with a server to make a transition of a screen displayed on a display unit of the terminal device. The terminal device comprises: a screen storage unit configured to store a plurality of screen information for respectively displaying a plurality of screens with sequential transitions; a first storage unit configured to store first template information used for associating a plurality of first kind operation units of the terminal device with a plurality of transition instructions for instructing screen transitions by operating the plurality of first kind operation units, respectively; a validating unit configured to validate any of the plurality of first kind operation units associated by the first template information and not to validate the other of the plurality of first kind operation units associated by the first template information; a first transmission control unit configured to transmit operation information representing that the first kind operation unit validated by the validating unit is operated, to the server; a display control unit configured to display a screen on the display unit according to screen information stored in the screen storage unit, and when the first kind operation unit validated by the validating unit is operated, to make a transition of the screen displayed on the display unit according to the transition instruction based on the operation to the validated first kind operation unit; and a first reception control unit configured to receive first instruction information representing any of the plurality of transition instructions, from the server, wherein the validating unit is configured to validate a first kind operation unit which is associated with a transition instruction represented by the first instruction information received by the first reception control unit, among the plurality of first kind operation units associated by the first template information, and not to validate the other first kind operation unit which is associated with the other transition instruction not represented by the first instruction information, among the plurality of first kind operation units associated by the first template information, wherein the first reception control unit is configured to receive new first instruction information transmitted from the server having received the operation information transmitted by the first transmission control unit, and wherein the validating unit is configured to validate a first kind operation unit which is associated with a transition instruction represented by the new first instruction information received by the first reception control unit, and does not validate the other first kind operation unit which is associated with the other transition instruction not represented by the new first instruction information.

According to another illustrative embodiment of the present invention, there is provided a server configured to perform communication with a terminal device to make a transition of a screen displayed on a display unit of the terminal device. The server comprises: a third storage unit configured to store a plurality of first instruction information, each of which represents any of a plurality of transition instructions for instructing a transition of the screen displayed on the display unit; a second transmission control unit configured to transmit any of the plurality of first instruction information to the terminal device; and a second reception control unit configured to receive operation information which is transmitted by the terminal device having received the first instruction information transmitted by the second transmission control unit, the operation information representing that a first kind operation unit associated with the transition instruction represented by the first instruction information is operated, wherein, when the second reception control unit receives the operation information, the second transmission control unit is configured to transmit new first instruction information.

According to a further illustrative embodiment of the present invention, there is provided a screen control method of making a transition of a screen displayed on a display unit of a terminal device by communication between the terminal device and a server, the terminal device including: a first storage unit configured to store first template information used for associating a plurality of first kind operation units of the terminal device with a plurality of transition instructions for instructing screen transitions of the screen displayed on the display unit of the terminal device by operating the corresponding first kind operation units, respectively; and a screen storage unit configured to store a plurality of screen information for respectively displaying a plurality of screens with sequentially transitions, the server including a third storage unit configured to store a plurality of first instruction information, each of which represents any of the plurality of transition instructions, the screen control method comprising: by the terminal device, receiving first instruction information from the server; validating a first kind operation unit associated with a transition instruction represented by the received first instruction information, among the plurality of first kind operation units associated by the first template information, and not validating the other first kind operation unit which is associated with the other transition instruction not represented by the received first instruction information; transmitting operation information representing that the validated first kind operation unit is operated, to the server; displaying a screen on the display unit according to screen information stored in the screen storage unit, and when the validated first kind operation unit is operated, making a transition of the screen displayed on the display unit according to the transition instruction based on the operation to the validated first kind operation unit; receiving new first instruction information transmitted from the server having received the operation information transmitted by the transmitting step; and validating a first kind operation unit which is associated with a transition instruction represented by the received new first instruction information, and not validating a first kind operation unit which is associated with a transition instruction which is not represented by the first instruction information, by the server, transmitting first instruction information to the terminal device; receiving operation information which is transmitted by the terminal device having received the first instruction information transmitted by the transmitting step; and when receiving the operation information, transmitting new first instruction information.

According to a further illustrative embodiment of the present invention, there is provided a screen transition method performed by a server including a third storage unit configured to store a plurality of first instruction information, each of which represents any of a plurality of transition instructions for instructing a transition of a screen displayed on a display unit of a terminal device, the screen transition method configured to make a transition of the screen displayed on the display unit by communication with the terminal device. The screen transition method comprises: transmitting first instruction information to the terminal device; receiving operation information which is transmitted by the terminal device having received the first instruction information transmitted by the transmitting step, the operation information representing that a first kind operation unit associated with the transition instruction represented by the first instruction information is operated; and when receiving the operation information, transmitting new first instruction information.

According to a further illustrative embodiment of the present invention, there is provided a non-transitory computer-readable medium having a computer program thereon and readable by a computer controlling a terminal device configured to perform communication with a server to make a transition of a screen displayed on a display unit of the terminal device, the terminal device including: a first storage unit configured to store first template information used for associating a plurality of first kind operation units of the terminal device with a plurality of transition instructions for instructing screen transitions by operating the plurality of first kind operation units, respectively; and a screen storage unit configured to store a plurality of screen information for respectively displaying a plurality of screens with sequentially transitions, the computer program, when executed by the computer, causing the computer to perform operations comprising: receiving first instruction information representing any of the plurality of transition instructions, from the server; validating a first kind operation unit which is associated with a transition instruction represented by the received first instruction information, among the plurality of first kind operation units associated by the first template information, and not validating the other first kind operation unit which is associated with the other transition instruction not represented by the first instruction information, among the plurality of first kind operation units associated by the first template information; transmitting operation information representing that the validated first kind operation unit is operated, to the server; displaying a screen on the display unit according to screen information stored in the screen storage unit, and when the validated first kind operation unit is operated, making a transition of the screen displayed on the display unit according to the transition instruction based on the operation to the validated first kind operation unit, receiving new first instruction information transmitted from the server having received the operation information transmitted by the transmitting step; and validating a first kind operation unit which is associated with a transition instruction represented by the received new first instruction information, and not validating the other first kind operation unit which is associated with the other transition instruction not represented by the received new first instruction information.

According to a further illustrative embodiment of the present invention, there is provided a non-transitory computer-readable medium having a computer program thereon and readable by a computer controlling a server including a third storage unit configured to store a plurality of first instruction information, each of which represents any of a plurality of transition instructions for instructing a transition of a screen displayed on a display unit of a terminal device, the computer program being for making a transition of the screen displayed on the display unit by communication with the terminal device, the computer program, when executed by the computer, causes the computer to perform operations comprising: transmitting first instruction information to the terminal device; receiving operation information which is transmitted by the terminal device having received the first instruction information transmitted by the transmitting step, the operation information representing that a first kind operation unit associated with the transition instruction represented by the first instruction information is operated; and when receiving the operation information, transmitting new first instruction information.

According to the above configurations, it may be possible to reduce a communication load between devices during information communication regarding screen display, and effectively display screens regarding an extended function such as a newly added service.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIGS. 3A to 3O are diagrams illustrating description contents of various types of individual definition information, wherein:

FIG. 3A is a diagram illustrating description contents of individual definition information for displaying a screen to enable the user to select whether to use an external server or a function of the device;

FIG. 3B is a diagram illustrating description contents of individual definition information for displaying a screen to enable the user to select whether it is allowed to use the external service;

FIG. 3C is a diagram illustrating description contents of individual definition information for displaying a screen to enable the user to select a desired service from a service A and a service B which are external services;

FIG. 3D is a diagram illustrating description contents of individual definition information for displaying a screen to enable the user to select whether to use an upload service or a download service;

FIG. 3E is a diagram illustrating description contents of individual definition information for displaying a screen to enable the user to confirm that the user uses the upload service;

FIG. 3F is a diagram illustrating description contents of individual definition information for displaying a screen to enable the user to select whether to store image data in a medium or print the image data.

FIG. 3G is a diagram illustrating description contents of individual definition information for displaying a screen to enable the user to select desired image data from a plurality of image data;

FIG. 3H is a diagram illustrating description contents of individual definition information for displaying a screen to enable the user to confirm that an error has occurred in communication with a server for an external service;

FIG. 3I is a diagram illustrating description contents of individual definition information for executing download of image data;

FIG. 3J is a diagram illustrating description contents of individual definition information for displaying a screen to enable the user to select whether to read a medium or perform scanning;

FIG. 3K is a diagram illustrating description contents of individual definition information for executing upload of image data;

FIG. 3L is a diagram illustrating description contents of individual definition information for displaying a screen to enable the user to select whether to perform copying or scanning;

FIG. 3M is a diagram illustrating description contents of individual definition information for displaying a screen to enable the user to input a copy resolution;

FIG. 3N is a diagram illustrating description contents of individual definition information for displaying a screen to enable the user to select whether to start copying; and FIG. 3O is a diagram illustrating description contents of individual definition information for performing copying;

FIGS. 4A to 4D are diagrams illustrating a plurality of types of screens displayed on a display unit having a touch panel function, wherein:

FIG. 4A is a diagram illustrating a screen (list screen including a text list) which is generated according to the individual definition information shown in FIG. 3C;

FIG. 4B is a diagram illustrating a screen (list screen including an image list) which is generated according to the individual definition information shown in FIG. 3G;

FIG. 4C is a diagram illustrating a screen (message screen) which is generated according to the individual definition information shown in FIG. 3H; and FIG. 4D is a diagram illustrating a screen (input box screen) which is generated according to the individual definition information shown in FIG. 3M;

FIG. 6 (FIGS. 6A and 6B) is a diagram illustrating an example of template information of a case where the display unit of the multi-function device has a touch panel function, and an example of template information of a case where the display unit of the multi-function device does not have a touch panel function;

FIG. 9 is a flow chart illustrating a main process executed by the relay server;

FIGS. 10A and 10B are diagrams illustrating tree information and an undetermined table, respectively;

FIGS. 11A and 11B are diagrams illustrating a first mapping table and a second mapping table, respectively;

FIG. 12 is a diagram illustrating a setting information table;

FIG. 13 is a diagram illustrating description contents of individual definition information which is obtained by adding a list item 'SERVICE C' to the individual definition information shown in FIG. 3C and is for displaying a screen to enable the user to select any one of a service A, a service B, and a service C which are external services;

FIG. 14 is a diagram illustrating an undetermined table obtained by adding a description of a case where determined information of a unique number 003 is the service C to unique numbers 003B and 006A of the undetermined table of FIG. 10B; and FIG. 15 is a diagram illustrating a setting information table obtained by adding a setting item 'List of processes which service C provides' to the setting information table of FIG. 12.

DETAILED DESCRIPTION

A system 1 according to an illustrative embodiment of the present invention will be described with reference to the accompanying drawings. The present invention is not limited by a configuration described below, but can have various configurations without departing from the scope of the present invention. For example, a portion of the following configuration may be omitted or substituted with another configuration. Also, a portion of the following configuration may include another configuration.

<Entire Configuration of System>

Figure 1:
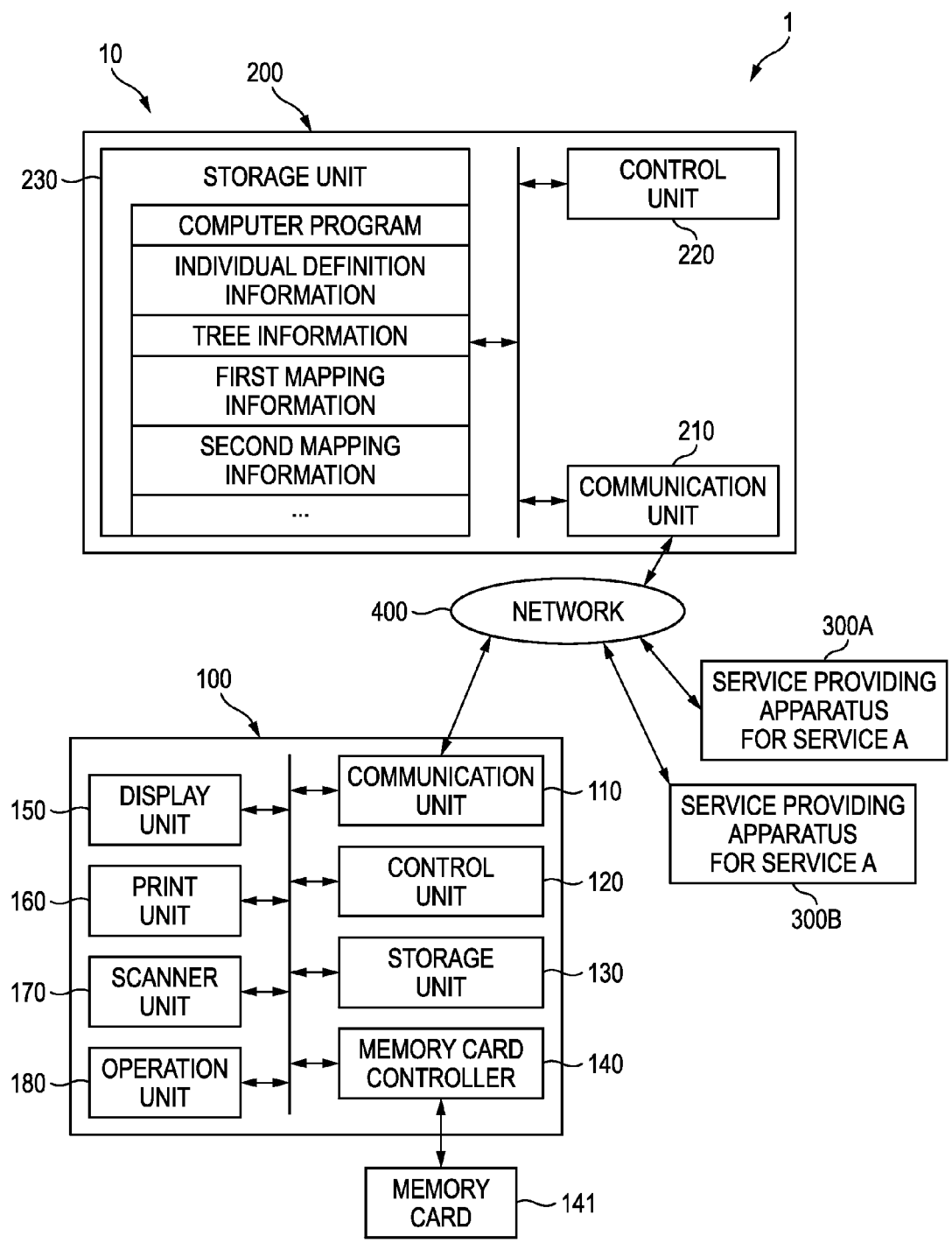
FIG. 1 is a diagram illustrating an example of an entire configuration of a system according to an illustrative embodiment of the present invention, and specifically, a block diagram illustrating an example of a hardware configuration of a multi-function device and a relay server included in a screen control system configuring a part of the system according to the illustrative embodiment.

An entire configuration of the system 1 including a screen control system 10 will be described with reference to FIG. 1. The system 1 is, for example, a service cooperation system. The system 1 includes the screen control system 10, and service providing servers 300A and 300B (collectively referred to as a service providing server 300). The screen control system 10 includes a multi-function device 100 and a relay server 200. In the system 1, the multi-function device 100, the relay server 200, and the service providing servers 300A and 300B are connected to one another through a network 400 to be capable of data communication. FIG. 1 shows a single multi-function device 100; however, a plurality of multi-function devices 100 may exist. Examples of the network 400 include an Internet network. The data communication is performed based on, for example, HTTP/1.1.

In the system 1, it is possible to upload and download electric files in electric-file storing services provided by service providers. Examples of other services provided by the system 1 include a document generating/editing service. According to the document generating/editing service, a user can perform at least one process of generating and editing of a document and share the document (electric file) with other users. The services such as an electronic-file storing service are provided by the service providing server 300 provided on the Internet by each service provider. The service providing server 300 is a known web server. The service providing server 300 performs HTTP-based communication with terminals connected to the network 400 such as the Internet so as to provide predetermined services to the terminals. In the following description, the above-mentioned services such as the electronic-file storing service are referred to as services A and B. The service A is provided by the service providing server 300A, and the service B is provided by the service providing server 300B.

The multi-function device 100 is specifically a small-sized digital combined machine. The multi-function device has, for example, a printing function, a scanner function, a copying function, and a fax function. The multi-function device 100 can upload, for example, electronic files of images read by the scanner function, to a service providing server for an electronic-file storing service. Also, the multi-function device 100 can download electronic files from the service providing server for the electronic-file storing service, and prints the downloaded electric files by the printing function of the multi-function device 100. The multi-function device 100 receives the electric-file storing service in cooperation with the relay server 200. At this time, screens displayed on a display unit 150 of the multi-function device 100 are managed by the relay server 200, and transition according to instructions from the relay server 200. The relay server 200 may be a device having a known server function. The relay server 200 may be a server owned by the manufacturer of the multi-function device 100. Alternatively, the relay server 200 may be an existing rental server or virtual server.

<Hardware Configuration of Multi-Function Device and Relay Server>

A hardware configuration of the multi-function device 100 and the relay server 200 included in the screen control system 10 will be described with reference to FIG. 1. The multi-function device 100 includes a communication unit 110, a control unit 120, a storage unit 130, a memory card controller 140, a display unit 150, a print unit 160, a scanner unit 170, and an operation unit 180. The communication unit 110 performs communication with other apparatuses connected to the network 400. As the communication unit 110, a known network card can be used. The control unit 120 includes a central processing unit (CPU), and a ROM and a RAM electrically connected to the CPU (not shown), and configures a computer. The CPU controls the operation of the multi-function device 100 according to computer programs stored in the ROM. The computer programs stored in the ROM include computer programs for each of processes shown in FIGS. 2, 5, and 8. Further, the computer programs stored in the ROM include a rendering driver for generating screens based on texts written in a markup language such as XML. The RAM temporally stores various types of data.

The storage unit 130 may be a known non-volatile storage device such as a NAND-type flash memory. The storage unit 130 stores various types of data such as template information which is shown in FIG. 6 and will be described below. The memory card controller 140 performs control of storage of a memory card 141 inserted into the multi-function device 100. Specifically, the memory card controller 140 performs writing of data in a memory card 141, erasing of data stored in the memory card 141, reading of data stored in the memory card 141, or the like, based on an instruction of the control unit 120. In the memory card 141, electronic files having predetermined formats are stored. The display unit 150 has a display device such as an LCD. The display unit 150 displays various screens to be described below. The display unit 150 may be a model have a touch panel function (hereinafter, referred to as a touch panel model). The print unit 160 prints images according to an instruction of the control unit 120. The scanner unit 170 reads images recorded on sheets set by the user. The scanner unit 170 reads images according to an instruction of the control unit 120. The operation unit 180 includes a plurality of operation buttons operable by the user, and transmits a signal according to operations, such as pushing, of the user to the control unit 120. The user can input a desired instruction by operating the operation unit 180.

In a case of the touch panel model, the user can input a desired instruction by operating the display unit 150. For example, keys (such as a 'ENTER' key (which is a key for a transition instruction) and an 'UP' key (which is not a key for a transition instruction)) shown in FIGS. 4A to 4D are not included in the operation unit 180, and are implemented by the touch panel function of the display unit 150. The operation unit 180 includes an item selection key and number selection keys to be described below.

If the multi-function device 100 has no touch panel function in the display unit 150 (hereinafter, referred to as a non-touch-panel model), the keys (such as the 'ENTER' key (which is a key for a transition instruction) and the 'UP' key (which is not a key for a transition instruction)) shown in FIGS. 4A to 4D are assigned as hard keys of the operation unit 180. Even in the case of the non-touch-panel model, the operation unit 180 includes the item selection key and the number selection keys to be described below.

The relay server 200 includes a communication unit 210, a control unit 220, and a storage unit 230. The communication unit 210 performs communication with other apparatuses connected to the network 400. As the communication unit 210, a known network card can be used. The control unit 220 includes a CPU, and a ROM and a RAM electrically connected to the CPU (not shown), and configures a computer. The CPU controls the operation of the relay server 200 according to computer programs stored in the ROM and the storage unit 230. The RAM temporally stores various types of data. The storage unit 230 may be a known non-volatile storage device such as a hard disk drive. The storage unit 230 stores computer programs. The stored computer programs include, for example, a computer program for a process shown in FIG. 9. Further, the stored computer programs include a computer program for performing communication with the service providing server 300 to provide the services to the multi-function device 100. The relay server 200 will be described as a physically existing server; however, the relay server 200 may be a virtual machine which functions as a server in cooperation with a plurality of physical apparatuses.

The storage unit 230 stores individual definition information shown in FIGS. 3A to 3O, tree information and an undetermined table shown in FIGS. 10A and 10B, a first mapping table and a second mapping table shown in FIGS. 11A and 11B, and a setting information table shown in FIG. 12. The setting information table (to be described below in detail) includes determined information which has been determined by an operation of the user on the 'ENTER' key in the multi-function device 100, and setting information which is not determined information. Examples of the setting information which is not determined information in the setting information table shown in FIG. 12 include a 001 flag which is turned on or off by an internal process of the relay server 200, a list of processes which the service A provides and a list of processes which the service B provides, error identification information which is updated by communication between the relay server 200 and the service providing server 300, a list of thumbnails of image data, and a list of data names of the image data. The lists of processes are set in advance by a manager of the relay server 200.

<Main Process Executed by Multi-Function Device>

A main process executed by the multi-function device 100 will be described with reference to FIG. 2. In order to start the main process, the user inputs process start to the multi-function device 100. Specifically, if the multi-function device 100 is a touch panel model, a plurality of application start icons are displayed on the display unit 150 of the multi-function device 100 which is in a standby state. The user touches any one application start icon of the plurality of application start icons. The application start icons include an application start icon for instructing start of a remote UI from a top screen, and an application start icon for instructing start of the remote UI from a screen regarding any one of the functions (such as copying and scanning) of the multi-function device 100. When the user touches the application start icon for instruct-ing start of the remote UI from the top screen, the control unit 120 transmits application start request information which does not include information specifying a device function to the relay server 200. When the user touches the application start icon for instructing start of the remote UI from a screen regarding any one function, the control unit 120 transmits application start request information which includes information specifying a device function to the relay server 200. The top screen is a screen which is displayed on the display unit 150 according to individual definition information having a unique number 001 (see FIG. 3A) to enable the user to select whether to use an external service or a function of the multi-function device 100. When the user selects to use an external service, a remote UI for using the external service is implemented, and when the user selects to use a function of the multi-function device 100, a remote UI for using the function of the multi-function device 100 is implemented.

Meanwhile, in a case of the non-touch panel model, in order to start the main process, the user pushes an operation button of the operation unit 180 associated with the start of the main process. When starting the main process, in step S100, the control unit 120 controls the communication unit 110 to transmit application start request information without any information specifying a device function, to the relay server 200. Then, the control unit 120 stands by until individual definition information, which the relay server 200 transmits in response to the transmitted application start request information, is received (No in step S102). The control unit 120 controls the communication unit 110 to receive the individual definition information. If receiving the individual definition information (Yes in step S102), the control unit 120 makes determination on an instruction type of the received individual definition information in step S104. The received individual definition information is stored in the RAM included in the control unit 120 or the like.

The individual definition information includes various types of information as shown in FIG. 3A to 3O. Specifically, as shown in FIGS. 3A to 3O, each of the individual definition information includes a unique number and an instruction type. The unique number has a function as a unique identifier for identifying the individual definition information. Individual definition information shown in FIGS. 3A to 3H, 3J, and 3L to 3N is individual definition information in which the instruction type represents a UI instruction, and which includes UI instruction information. The UI instruction information includes a screen type (a determined information input type), a title, information representing whether each transition instruction by a 'ENTER' key, a 'PREVIOUS' key, and a 'NEXT' key is valid or invalid, and unique information. Operation of any one key of the 'ENTER' key, the 'PREVIOUS' key, and the 'NEXT' key becomes operations for making a transition (change) of a screen displayed on the display unit 150. Unique list information shown in FIGS. 3A to 3D, 3F to 3G, 3J, 3L, and 3N is unique information included in UI instruction information in which the screen type is a list type. Unique message information shown in FIGS. 3E and 3H is unique information included in UI instruction information in which the screen type is a message type. Unique input box information shown in FIG. 3M is unique information included in UI instruction information in which the screen type is an input box type. The unique input box information includes an initial value for an input box, characters capable of being input, the maximum number of characters, and the minimum number of characters. Individual definition information shown in FIGS. 3I, 3K, and 3O is individual definition information in which the instruction type represents a function operation instruction, and includes function operation instruction information. The function operation instruction information includes an operation type. The individual definition information in which the instruction type represents the function operation instruction includes parameters for executing a designated function as described below. The multi-function device 100 performs functions such as the printing function, the scanner function, and the copying function according to those parameters. The above-mentioned information included in the individual definition information will be described below.

When the instruction type included in the individual definition information stored in the RAM represents the function operation instruction (function operation instruction in step S104), in step S106, the control unit 120 controls at least one of the print unit 160, the scanner unit 170, the memory card controller 140, and the communication unit 110 such that a function corresponding to the operation type included in the function operation instruction information is performed based on the parameters. For example, the individual definition information shown in FIG. 3I includes the operation type representing download. In this case, according to the parameters of the instruction and the data name described in the individual definition information, the control unit 120 controls the communication unit 110 to download image data stored in the service providing server 300. When the individual definition information includes a parameter representing printing of downloaded image data, according to the parameters of the instruction and the printing described in the individual definition information, the control unit 120 controls the print unit 160 to print the image data. After executing step S106, the control unit 120 controls the communication unit 110 to transmit the function operation end information, representing that the function operation instructed in the individual definition information stored in the RAM has ended, to the relay server 200. On the occasion of the transmission of the function operation end information, the control unit 120 incorporates a unique number matching the unique number of the individual definition information stored in the RAM, in the function operation end information. Then, the control unit 120 returns to the process of step S102. At this time, the control unit 120 erases the individual definition information stored in the RAM.

Meanwhile, when the instruction type included in the individual definition information stored in the RAM represents the UI instruction (UI instruction in step S104), in step S110, the control unit 120 executes a screen information generating process. In the screen information generating process, the individual definition information stored in the RAM is referred to. The screen information generating process executed in step S110 will be described below. After executing the screen information generating process of step S110, in step S112, the control unit 120 displays a screen on the display unit 150 according to the screen information generated in step S110. In the multi-function device 100 which is a non-touch-panel model and is capable of lighting up hard keys configuring the operation unit 180, a backlight of a hard key instructed to be lit up is lit up according to the screen information. A hard key validated for instruction operation can be lit up to be visualized and thus it is possible to improve operability for the user.

The screen displayed on the display unit 150 in step S112 will be described with reference to FIGS. 4A to 4D. A case where the multi-function device 100 is a touch panel model is exemplified. When the individual definition information stored in the RAM is the individual definition information shown in FIG. 3C, a screen shown in FIG. 4A is displayed on the display unit 150. This screen is a list type screen based on the individual definition information in which the screen type represents a list type. The screen shown in FIG. 4A includes 'PLEASE SELECT SERVICE' described as a title in the individual definition information, and a 'ENTER' key (marked with 'ENTER' in FIG. 4A) based on a description that the 'ENTER' key is valid. Since it is described that the 'PREVIOUS' key and the 'NEXT' key are invalid, the 'PREVIOUS' key (marked with 'PREVIOUS' in FIG. 4D) and the 'NEXT' key (marked with 'NEXT' in FIG. 4D) are not included in the screen shown in FIG. 4A. The 'PREVIOUS' key and the 'NEXT' key may be included in the screen shown in FIG. 4A so as to be incapable of being operated (not operable). In this case, the 'PREVIOUS' key and the 'NEXT' key may be grayed out. Further, the screen shown in FIG. 4A includes selection choices such as 'SERVICE A' and 'SERVICE B'. Furthermore, the screen shown in FIG. 4A includes an 'UP' key and a 'DOWN' key (see two keys shown in FIG. 4A by an upright triangle and an upside-down triangle, respectively) as unique keys when the screen type represents the 'list' type. The user selects a desired service by operating (pushing or touching) the 'UP' key and the 'DOWN' key and operating keys with service names marked thereon. When a number of service names exist, if the DOWN key is operated, a list of a plurality of next service names may be displayed, and if the UP key is operated, a list of a plurality of previous service names may be displayed. One service is selectable in correspondence with 'selection of one choice' described as the selection method of the individual definition information.

When the individual definition information stored in the RAM is the individual definition information shown in FIG. 3G, the screen shown in FIG. 4B is displayed on the display unit 150. This screen is a list type screen based on the individual definition information in which the screen type represents the list type. The screen shown in FIG. 4B includes 'PLEASE SELECT SERVICE' described as the title in the individual definition information, and a 'ENTER' key based on a description that the 'ENTER' key is valid. The screen shown in FIG. 4B includes thumbnails of image data as selection choices. The user selects desired image data by touching a thumbnail. If the 'DOWN' key is operated, thumbnails of the next four image data items are displayed, and if the 'UP' key is operated, thumbnails of the previous four image data items are displayed. A plurality of image data items can be selectable in correspondence with 'selection of a plurality of choices' described as the selection method in the individual definition information.

Information described in parentheses in the individual definition information shown in FIG. 3G or the like is updated by a communication result between the multi-function device 100 and the service providing server 300, or an input of the user received by the multi-function device 100. Specifically, contents of 'LIST' and 'IMAGE LIST' described in the parentheses in the unique list information shown in FIG. 3G are updated by the communication result between the multi-function device 100 and the relay server 200. That is, when the control unit 120 performs processing according to the individual definition information, the unique list information has the updated latest value. In unique message information of FIG. 3H, contents of 'MESSAGE' described in parentheses are updated by the communication result between the multi-function device 100 and the relay server 200. That is, when the control unit 120 performs processing according to the individual definition information, the unique message information has the updated latest value. In the function operation instruction information of FIG. 3I, contents of 'PARAMETER' described in parentheses are updated by an input of the user received by the multi-function device 100. Specifically, 'DATA NAME OF IMAGE DATA' is updated by input operation of the user to select image data in the screen (FIG. 4B) generated according to the individual definition information shown in FIG. 3G 'STORING-IN-MEDIUM/PRINTING' is updated by input operation of the user to store image data in a medium or print the image data in a screen (not shown) generated according to the individual definition information shown in FIG. 3F. That is, when the control unit 120 performs processing according to the individual definition information, the function operation instruction information has the updated latest value. With respect to the contents of 'PARAMETER' described in parentheses in the function operation instruction information of FIGS. 3K and 3O, similarly, when the control unit 120 performs processing according to the individual definition information, the function operation instruction information has the updated latest value.

When the individual definition information stored in the RAM is the individual definition information shown in FIG. 3H, a screen shown in FIG. 4C is displayed on the display unit 150. This screen is a message type screen based on the individual definition information in which the screen type represents a message type. The screen shown in FIG. 4C includes 'SERVER ERROR' described as the title in the individual definition information, and the 'NEXT' key based on a description in which the 'NEXT' key is valid. Since it is described that the 'ENTER' key and the 'PREVIOUS' key are invalid, the 'ENTER' key and the 'NEXT' key are not included in the screen shown in FIG. 4C. Similarly to the above, the 'ENTER' key and the 'PREVIOUS' key may be displayed in a state (including a state in which the 'ENTER' key and the 'PREVIOUS' key have been grayed out) in which the 'ENTER' key and the 'PREVIOUS' key are incapable of being operated (not operable). Further, in the screen shown in FIG. 4C, any key unique to the screen type is not included. The screen shown in FIG. 4C includes 'COMMUNICATION WITH SERVER HAS FAILED' as a message corresponding to the message 'PLEASE SELECT IMAGE DATA' shown in FIG. 4B. If the user has confirmed the message, the user pushes the 'NEXT' key.

When the individual definition information stored in the RAM is the individual definition information shown in FIG. 3M, a screen shown in FIG. 4D is displayed on the display unit 150. This screen is an input box type screen based on the individual definition information in which the screen type represents an input box type. The screen shown in FIG. 4D includes 'COPY RESOLUTION' described as the title of the individual definition information, the 'ENTER' key based on a description in which the 'ENTER' key is valid, the 'PREVIOUS' key based on a description in which the 'PREVIOUS' key is valid, and the 'NEXT' key based on a description in which the 'NEXT' key is valid. The screen shown in FIG. 4D includes a left arrow key and a right arrow key (see two keys shown in FIG. 4D by a left arrow and a right arrow), a 'CLEAR' key (marked with 'CLEAR' in FIG. 4D) for erasing a numerical value input in the input box, and numerical keys of 0 to 9 (marked with '0' to '9' in FIG. 4D), as keys unique to a case where the screen type represents the 'input box' type. The numerical keys of 0 to 9 correspond to information representing that characters capable being input are numerical values, and only numerical values can be input into the input box. In the input box of the screen of FIG. 4D, '200' described as the initial value for the input box is displayed as an initial value of the copy resolution. In a case of changing the copy resolution from the initial value of 200 dpi to, for example, 300 dpi, the user operates the left arrow key or the right arrow key so as to move a cursor for inputting a numerical value to the position of '2', operates the 'CLEAR' key so as to erase '2', and operates the numerical key of '3'. In this manner, the user inputs the desired resolution of 300 dpi. The input resolution is a 3-digit numerical value corresponding to information representing that the maximum number of characters is 3 and the minimum number of characters is 3.

If the multi-function device 100 is a non-touch-panel model, each of the 'ENTER' key, the 'PREVIOUS' key, and the 'NEXT' key is assigned to a predetermined hard key of the operation unit 180, and is validated such that predetermined instruction operation is enabled. In the non-touch-panel model, in a list type screen, the item selection key for selecting a predetermined service item is individually provided. The user operates the 'UP' key and the 'DOWN' key so as to move a button to a position representing a desired service, and operates the item selection key. The desired service is selected by the operation of the item selection key. Similarly, in an input box type screen, number selection keys for selecting the numbers 0 to 9 displayed in the screen are individually provided. In a case of changing 200 dpi, displayed as the initial value, to 300 dpi, the user performs the following operation. The user operates a hard key corresponding to the 'CLEAR' key. In this manner, the entire '200' in the input box is erased. Next, the user operates a hard key corresponding to the left arrow key or the right arrow key so as to move the button to the position of '3' included in the displayed screen, and operates the number selection key one time. '3' is input to the input box by the operation of the number selection key. Subsequently, the user moves the button to the position of '0', and operates the number selection key two times in order. Two '0's can be input to the input box by the two times of operation of the number selection key, such that the displayed value becomes '300'. In the case of the non-touch-panel model, a key (for example, the 'UP' key, the 'DOWN' key, the left arrow key, and the right arrow key) of which operation is assigned to a hard key may not be included in the screen.

After executing step S112, in step S114, the control unit 120 determines whether any key has been operated in each screen display. The control unit 120 stands by until any key is operated (No in step S114). When any key has been operated (Yes in step S114), in step S116, the control unit 120 determines whether the operated key is a key unique to the screen type. Here, the key unique to the screen type is a key other than keys that are described as valid or invalid in the individual definition information. Specifically, examples of the key unique to the screen type include the 'UP' key and the 'DOWN' key shown in FIG. 4A, and the left arrow key, the right arrow key, the 'CLEAR' key, and numerical keys of 0 to 9 shown in FIG. 4D. When the operated key is a key unique to the screen type (Yes in step S116), in step S118, the control unit 120 executes a process unique to the screen type. For example, when a number of service names are displayed in the screen shown in FIG. 4A, if the 'DOWN' key is operated, the control unit 120 displays a list of a plurality of next service names. In this list display state, if any key representing a selection choice is operated, specifically, if a key representing 'SERVICE A' is operated to select the service A as a selection choice, the control unit 120 stores an item number representing the service A in the RAM. Since the service A is displayed at the top of the list, the item number is '1'. Further, the control unit 120 stores a value, which has been input in the input box in the screen shown in FIG. 4D, in the RAM. Specifically, if the input value is '200', the control unit 120 stores 200 as input character string information in the RAM, and if the input value is '300', the control unit 120 stores 300 as input character string information in the RAM. In the case of the non-touch-panel model, if any one of the 'CLEAR' key, the left arrow key, the right arrow key, and the item selection key is operated to change the value displayed in the input box as described above, the control unit 120 appropriately executes the process unique to the screen type. After executing step S118, the control unit 120 returns to the process of step S114.

When the operated key is not a key unique to the screen type, in order words, when the operated key is any one of the 'ENTER' key, the 'PREVIOUS' key, and the 'NEXT' key (No in step S116), in step S120, the control unit 120 determines whether it is described in the individual definition information stored in the RAM that the operated key is valid. When it is not described that the operated key is valid (No in step S120), the control unit 120 returns to the process of step S114. When it is described that the operated key is valid (Yes in step S120), in step S122, the control unit 120 executes the operation result information generating process. The operation result information generating process executed in step S122 will be described below. Subsequently, the control unit 120 controls the communication unit 110, in step S124, to transmit the generated operation result information to the relay server 200, and returns to the process of step S102. At this time, the control unit 120 erases the individual definition information stored in the RAM. The control unit 120 repeatedly executes the main process until end operation of the main process is input. After the main process ends, the multi-function device 100 returns to the standby state. The relay server 200 may be configured to transmit a standby instruction to the multi-function device 100. In this case, if receiving the standby instruction, the multi-function device 100 ends the main process.

The screen information generating process executed in step S110 of the main process shown in FIG. 2 will be described with reference to FIG. 5. When starting the screen information generating process, in step S200, the control unit reads UI instruction information of the individual definition information stored in the RAM. Then, the control unit 120 reads the template information stored in the storage unit 130 to the RAM in step S202. The template information has a configuration shown in FIG. 6. Upon reading the template information, the control unit 120 specifies the screen type according to the UI instruction information, and extracts unique screen type information according to the specified screen type, from the template information. Specifically, a case where the specified screen type is the list type, the control unit 120 extracts information representing what the unique key is, bitmap information representing the '▲(UP)' key and the '▼(DOWN)' key and the like shown in FIG. 6. In step S204, based on the information extracted from the template information, the control unit 120 specifies a key unique to the screen type, and generates screen information representing a portion of the screen displayed in step S112 of FIG. 2. Specifically, the control unit 120 generates the screen information for displaying the '▲(UP)' key, the '▼(DOWN)' key, and the like, specified according to the information representing what the unique key is, on the display unit 150. At this time, the control unit 120 incorporates predetermined information included in the UI instruction information, in the screen information. The incorporated predetermined information includes not only information described as a list, the initial value for the input box, and a message, but also, information described as the selection method, the maximum number of characters, and the minimum number of characters.

After executing step S204, in step S206, the control unit 120 adds a character string, described as the title in the UI instruction information, to the screen information generated in step S204. Then, in step S208, the control unit 120 validates the operation key for a screen transition, described as a valid key in the UI instruction information, according to the template information. Herein, the validating means the following process. That is, if the multi-function device 100 is a touch panel model, the validating means that the key assigned to instruction operation of each of the 'ENTER' key, the 'PREVIOUS' key, and the 'NEXT' key described as a valid key in the UI instruction information is made operable, and is included in the screen information. If the multi-function device 100 is a non-touch-panel model, the validating means that instruction operation of the 'ENTER' key, the 'PREVIOUS' key, or the 'NEXT' key is assigned any hard key included in the operation unit 180. Further, when it is possible to light up the hard keys, the hard key to which the instruction operation of the 'ENTER' key, the 'PREVIOUS' key, or the 'NEXT' key is assigned is lit up. In step S208, the control unit 120 makes operable the 'UP' key, the 'DOWN' key, the left arrow key, the right arrow key, the 'CLEAR' key, and the like according to the unique screen type information of the template information. After executing step S208, the control unit 120 returns to the process of step S112 of FIG. 2.

Specific examples executed in steps S204 and S208 will be described with reference to FIG. 7. In the description based on FIG. 7, a case where the multi-function device 100 is a touch panel model is exemplified. For example, when the individual definition information stored in the RAM is the individual definition information shown in FIG. 3C, first, in step S204, the control unit 120 extracts bitmap information, representing a basic screen of a list, as basic screen information from the template information shown in FIG. 6, according to the screen type representing the list type (see (A) of FIG. 7). In the unique screen type information (list type) of the template information shown in FIG. 6, the 'UP' key and the 'DOWN' key are associated as unique keys. Therefore, the control unit 120 extracts bitmap information representing the 'UP' key and the 'DOWN' key, and generates the screen information. This screen information is generated such that the bitmap information representing the 'UP' key and the 'DOWN' key are disposed at predetermined positions of bitmap information representing a basic screen according to information representing the positions of the 'UP' key and the 'DOWN' key included in the unique screen type information (list type). In other words, the control unit 120 generates screen information representing the screen shown in (A) of FIG. 7. Then, the control unit 120 disposes 'SERVICE A' and 'SERVICE B', described as selection choices in the unique list information of the UI instruction information, at predetermined positions according to information representing positions of selection choices included in the unique screen type information (list type) shown in FIG. 6. In other words, in step S204, the control unit 120 generates screen information representing a screen shown in (B) of FIG. 7. In this screen information, 'SERVICE A' and 'SERVICE B' are validated as selection choices of the list. The control unit 120 incorporates information representing 'SELECTION OF ONE CHOICE', described as the selection method in the UI instruction information, in the generated screen information.

Figure 7:
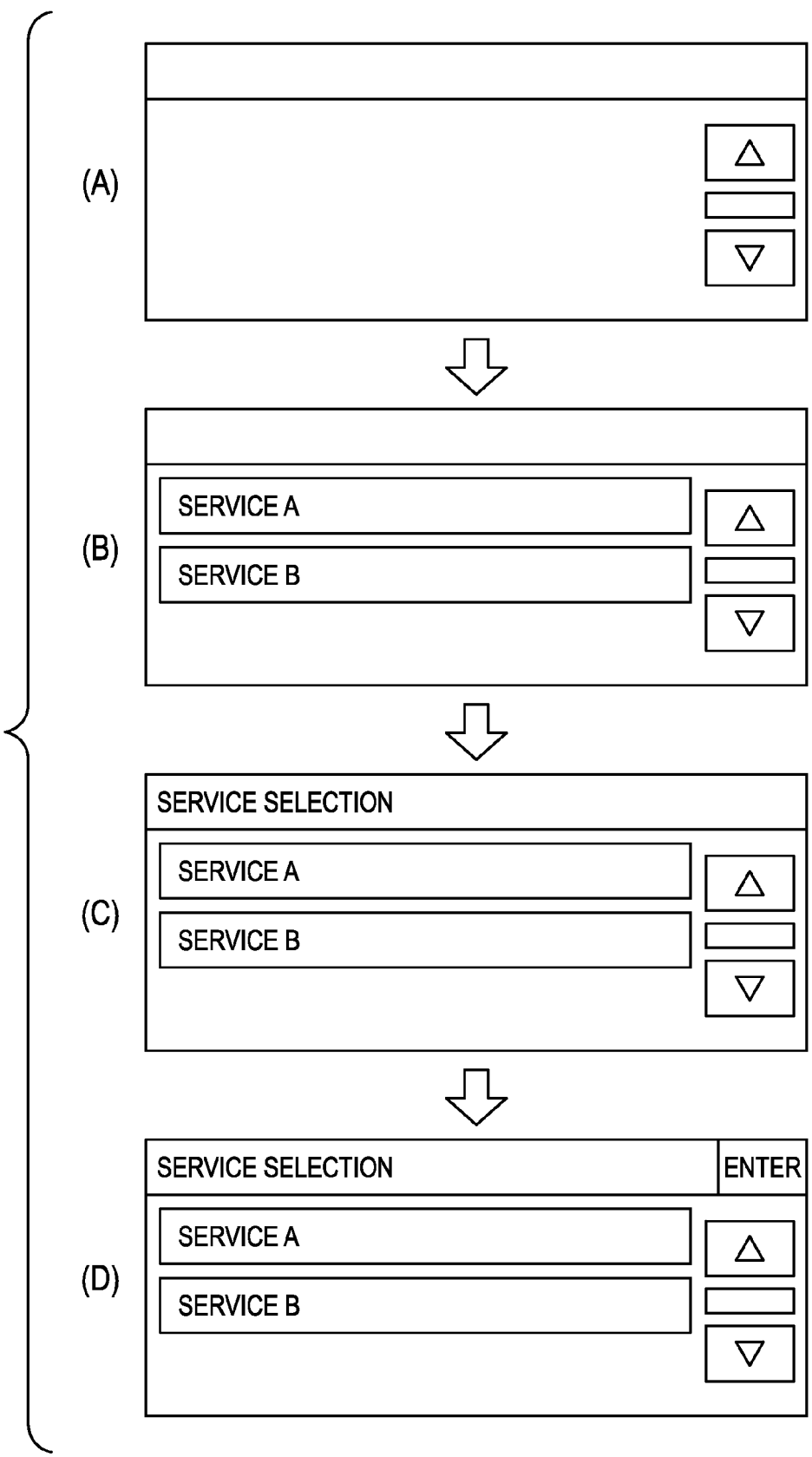
FIG. 7 is a diagram illustrating a process in which image information is generated in the image information generating process of FIG. 5.

Next, in step S206, the control unit 120 disposes the title 'SERVICE SELECTION' at a predetermined position according to information representing the position of the title included in the template information shown in FIG. 6 (see (C) of FIG. 7). That is, the control unit 120 generates screen information representing a screen shown in (C) of FIG. 7. Subsequently, in step S208, for the 'ENTER' key which is valid in the UI instruction information, the control unit 120 extracts bitmap information representing the 'ENTER' key, associated with determining operation, included in operation key information from the operation key information of the template information of FIG. 6 (see (D) of FIG. 7). That is, the control unit 120 generates screen information representing a screen shown in (D) of FIG. 7. In this screen information, the 'ENTER' key is validated as a key for inputting a transition instruction for a screen transition. As the key for inputting a transition instruction, in addition to the 'ENTER' key, the 'PREVIOUS' key and the 'NEXT' key may be exemplified.

<Operation Result Information Generating Process>

Figure 8:
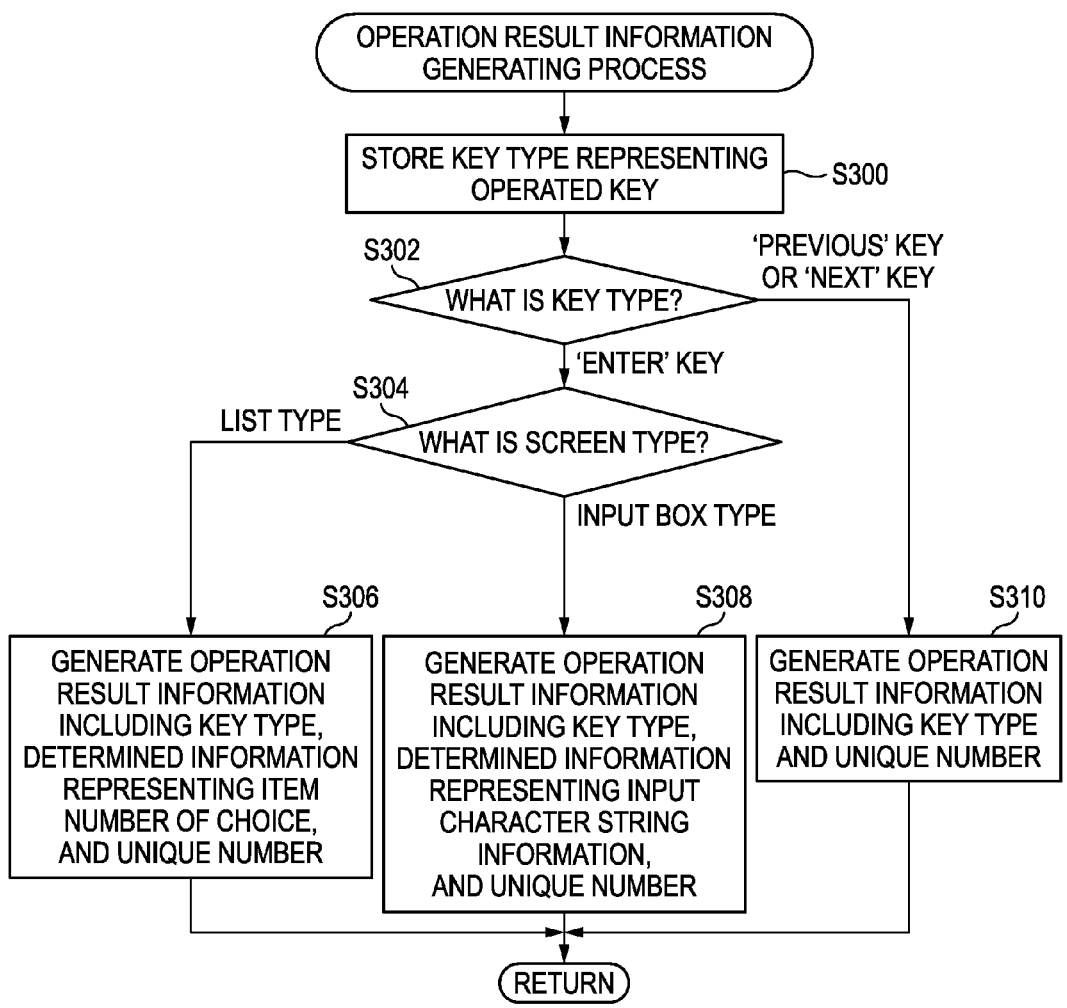
FIG. 8 is a flow chart illustrating an operation result information generating process executed in the main process of FIG. 2.

The operation result information generating process executed in step S122 of the main process shown in FIG. 2 will be described with reference to FIG. 8. When starting the operation result information generating process, the control unit 120 stores a key type, representing the key which has been operated in step S114 and has been determined as valid in step S120, in the RAM. The key which has been operated in step S114 and has been determined as valid in step S120 is any one of the 'ENTER' key, the 'PREVIOUS' key, and the 'NEXT' key. For example, in step S300, the control unit 120 stores the key type representing the 'ENTER' key. Subsequently, in step S302, the control unit 120 makes determination on the key type. When the key type represents the 'PREVIOUS' key or the 'NEXT' key ('PREVIOUS' key or 'NEXT' key in step S302), the control unit 120 proceeds to a process of step S310. Meanwhile, when the key type represents the 'ENTER' key ('ENTER' key in step S302), in step S304, the control unit 120 makes determination on the screen type of the screen displayed on the display unit 150 in step S112 of FIG. 2. The control unit 120 makes the determination of step S304 according to the UI instruction information of the individual definition information stored in the RAM. When the screen type is a message type, since the 'ENTER' key is not included in the screen of the display unit 150 (see FIG. 4C), the determination of step S304 is made only on a list type and an input box type.

When the screen type is the list type (list type in step S304), the control unit 120 stores an item number of a selection choice selected from the selection choices included in the list, in the RAM. Then, in step S306, the control unit 120 generates operation result information including the key type stored in step S300, the determined information and a unique number matching the unique information described in the individual definition information stored in the RAM, and stores the operation result information in the internal RAM of the control unit 120. For example, when 'SERVICE A' is selected in FIG. 4A, an item number '1' representing the service A is stored in the RAM in step S118 of FIG. 2. That is, the control unit 120 stores '1' as the determined information in the RAM. Next, the control unit 120 generates operation result information including the key type representing the 'ENTER' key stored in step S300, '1' as determined information, and a unique number matching the unique number described in the individual definition information ('003' described in the individual definition information shown in FIG. 3C) stored in the RAM. Here, the determined information means determined information determined to be stored in the RAM by operating the 'ENTER' key, among the selection choices of the list and an input character string in the input box displayed in the screens of the display unit 150. When the screen type is an input box type (input box type in step S304), the control unit 120 stores the input character string information as the determined information in the RAM. Then, in step S308, the control unit 120 generates operation result information including the key type stored in step S300, the determined information, and a unique number matching the unique number described in the individual definition information stored in the RAM, and stores the operation result information in the internal RAM of the control unit 120. For example, when the initial value of 200 dpi is determined in FIG. 4D, '200' is stored in step S118 of FIG. 2. When the resolution has been changed to 300 dpi, '300' is stored in step S118 of FIG. 2. That is, the control unit 120 stores the '200' or '300' as the determined information in the RAM. Next, the control unit 120 generates operation result information including the key type representing the 'ENTER' key, '200' or '300' as the determined information, and a unique number matching the unique number described in the individual definition information ('013' described in the individual definition information shown in FIG. 3M) stored in the RAM.

Also, in step S310, the control unit 120 generates operation result information including the key type stored in step S300 and a unique number matching the unique number described in the individual definition information stored in the RAM, and stores the operation result information in the internal RAM of the control unit 120. After executing step S306, S308, or S310, the control unit 120 returns to the process of step S124 of FIG. 2.

<Main Process Executed by Relay Server>

A main process executed by the relay server 200 will be described with reference to FIG. 9. The control unit 220 of the relay server 200 stands by until receiving predetermined information from the multi-function device 100 through the network 400 (No in step S400). When the main process shown in FIG. 9 starts, the control unit 220 of the relay server 200 stores that a 001 flag is 'ON' in the RAM. The 001 flag will be described below in detail. The control unit 220 controls the communication unit 210 to receive the predetermined information. When receiving the predetermined information (Yes in step S400), in step S401, the control unit 220 determines the type of the received predetermined information. The received predetermined information is stored in the RAM or the like configuring the control unit 220. Herein, the received predetermined information may be stored as it is, or the received predetermined information may be analyzed and be stored in a format appropriate for the subsequent process. Alternatively, the received predetermined information may be stored in the storage unit 230. The received predetermined information is any one of the application start request information, the function operation end information, and the operation result information. The application start request information is transmitted in step S100 of FIG. 2, the function operation end information is transmitted in step S108 of FIG. 2, and the operation result information is transmitted in step S124 of FIG. 2. When the predetermined information is the application start request information (application start request information in step S401), in step S402, the control unit 220 determines whether any information specifying a device function is included in the application start request information. When any information specifying a device function is included in the application start request information (Yes in step S402), in step S403, the control unit 220 reads individual definition information corresponding to the function specified by the application start request information, into the RAM. The unique number of the individual definition information corresponding to each function is stored in the storage unit 230. Specifically, the control unit 220 reads the unique number of the individual definition information corresponding to the function specified by the application start request information, from the storage unit 230 into the RAM. Subsequently, the control unit 220 reads tree information shown in FIG. 10A, from the storage unit 230 into the RAM. The control unit 220 reads the individual definition information registered in correspondence with the unique number having been read into the RAM in the tree information, from the storage unit 230 into the RAM. For example, when the application start request information specifies the copy function, the control unit 220 reads the individual definition information corresponding to the unique number '013', from the storage unit 230 into the RAM. When any information specifying a device function is not included in the application start request information (No in step S402), in step S404, the control unit 220 reads the first individual definition information, that is, the individual definition information for displaying a top screen of a remote UI on the display unit 150 of the display unit 150, into the RAM. The individual definition information having the smallest unique number becomes the first individual definition information. According to the tree information shown in FIG. 10A, the individual definition information having the unique number '001' is read from the storage unit 230 into the RAM.

Subsequent to step S404, in step S405, the control unit 220 stores that the 001 flag is 'ON', in the RAM. The 001 flag is a flag for storing a status in which the relay server 200 transmits the individual definition information having the unique number '001' to the multi-function device 100, in the relay server 200. As an example of a process of the control unit 220 according to the ON or OFF of the 001 flag, when the operation result information including the key type representing the 'PREVIOUS' key, and the unique number '013' (see FIG. 3M) has been received through the communication unit 110 and the 001 flag is 'ON', in step S408, the individual definition information having the unique number '001' is read from the storage unit 230 into the RAM for displaying the top screen of the remote UI on the display unit 150 of the multi-function device 100. In contrast, when the operation result information including the key type representing the 'PREVIOUS' key, and the unique number '013' (see FIG. 3M) has been received and the 001 flag is 'OFF', the control unit 220 stores that the 001 flag is 'OFF', in the RAM in step S420 without reading the individual definition information in step S408 to be described below, and controls the communication unit 210 in step S421, to transmit a standby instruction for ending the main process of the multi-function device 100 to make the multi-function device 100 the standby state, to the multi-function device 100.

When the predetermined information is the function operation end information (function operation end information in step S401), the control unit 220 proceeds to a process of step S412. When the predetermined information is the operation result information (operation result information in step S401), in step S406, the control unit 220 determines what the key type included in the received operation result information is. When the key type represents the 'PREVIOUS' key ('PREVIOUS' key in step S406), in step S408, the control unit 220 reads the previous individual definition information from the storage unit 230 into the RAM. Specifically, the control unit 220 may read the tree information shown in FIG. 10A into the RAM (the entire tree information read in step S403 or S404 may be used, and this is same in step S412 to be described below), and specifies the previous unique number of the unique number included in the operation result information, according to the tree information. For example, when the unique number included in the operation result information is 004 (see FIG. 3D), the control unit 220 specifies the unique number '003' according to the tree information. When the unique number included in the operation result information is '006' (see FIG. 3F), the tree information shows the previous unique number is undetermined. In this case, the tree information shows that the previous unique number is an undetermined 006A. In this case, the control unit 220 reads an undetermined table shown in FIG. 10B, from the storage unit 230 into the RAM. Subsequently, the control unit 220 specifies the previous unique number according to the undetermined table. In the undetermined 006A, when the determined information included in the operation result information having the unique number '003' is 'SERVICE A', '004' is specified as the previous unique number, and when the determined information included in the operation result information having the unique number '003' is 'SERVICE B', '005' is specified as the previous unique number. As described above, when the tree information represents the previous unique number as 'UNDETERMINED ***' like the 'undetermined 006A', the control unit 220 specifies the previous unique number according to the undetermined table shown in FIG. 10B. Then, the control unit 220 reads the individual definition information (previous individual definition information) including the specified unique number '003' from the storage unit 230 into the RAM.

When the unique number included in the operation result information is '001' (see FIG. 3A), the tree information represents the previous unique number as 'standby'. When the tree information represents the previous unique number as 'standby', the control unit 220 does not read the previous individual definition information.

When the key type represents the 'NEXT' key ('NEXT' key in step S406), the control unit 220 proceeds to the process of step S412. When the key type represents the 'ENTER' key ('ENTER' key in step S406), the control unit 220 reads first mapping table shown in FIG. 11A, from the storage unit 230 into the RAM. Further, the control unit 220 extracts the unique number included in the received operation result information. Subsequently, the control unit 220 specifies an item associated with a unique number matching the extracted unique number. Then, in step S411, the control unit 220 stores the determined information included in the operation result information, as setting information associated with the specified item in the setting information table. For example, when the received operation result information includes the key type representing the 'ENTER' key, the determined information 'EXTERNAL SERVICE', and the unique number '001', the control unit 220 specifies an item 'EXTERNAL SERVICE/DEVICE FUNCTION' associated to the unique number '001' according to the first mapping table. Then, the control unit 220 stores the received determined information 'EXTERNAL SERVICE' as setting information corresponding to the item 'EXTERNAL SERVICE/DEVICE FUNCTION' in the setting information table, as shown in FIG. 12. After executing step S411, the control unit 220 proceeds to the process of step S412.

In step S412, the control unit 220 reads the next individual definition information from the storage unit 230 into the RAM. Specifically, like in step S408, the control unit 220 specifies the next unique number of the unique number included in the received operation result information, according to the tree information shown in FIG. 10A and the undetermined table shown in FIG. 10B. For example, when the unique number included in the operation result information is '001' (see FIG. 3A), the control unit 220 recognizes that 'UNDETERMINED 001B' is stored in the tree information. When the determined information included in the operation result information having the unique number '001' represents 'EXTERNAL SERVICE', the control unit 220 specifies '002' as the next unique number according to the undetermined table, and when the determined information included in the operation result information having the unique number '001' represents 'DEVICE FUNCTION', the control unit 220 specifies '002' as the next unique number. When the tree information represents the next unique number as 'UNDE- TERMINED *' like the 'undetermined 001B', the control unit 220 specifies the next unique number according to the undetermined table shown in FIG. 10B. When the unique number included in the operation result information is '004' (see FIG. 3D), the control unit 220** specifies '006' as the next unique number according to the tree information.

When the unique number included in the operation result information is '006' (see FIG. 3F), the control unit 220 recognizes that 'UNDETERMINED 006B' is stored in the tree information. The control unit 220 acquires a thumbnail and data name of image data stored in a service providing server for the service, represented by the determined information included in the operation result information having the unique number '003' (the service providing server 300A when the determined information represents 'SERVICE A'), from the service providing server in accordance to the undetermined table. When the acquisition of the thumbnail and the data name ends normally, the control unit 220 specifies a unique number '007' as the next unique number. When the acquisition of the thumbnail and the data name ends erroneously, the control unit 220 specifies a unique number '008' as the next unique number. In this case where the tree information represents the next unique number as 'UNDETERMINED *' and a specific process is shown in the undetermined table, the control unit 220 executes the specific process in accordance to the undetermined table, so as to specify the next unique number corresponding to the executed specific program. Similarly, even when the tree information represents the previous unique number as 'UNDETERMINED *' and a specific process is shown in the undetermined table, the control unit 220 executes the specific process according to the undetermined table, so as to specify the previous unique number corresponding to the executed specific program.

When the unique number included in the operation result information is '009' (see FIG. 3I), the tree information represents the next unique number as 'STANDBY'. In this case where the tree information represents the next unique number as 'STANDBY', the control unit 220 does not read the next individual definition information.

The control unit 220 reads the individual definition information (next individual definition information) including the specified next unique number, from the storage unit 230 into the RAM. After executing step S408 or S414, in step S410, the control unit 220 determines whether the tree information represents the previous unique number or the next unique number as 'STANDBY'. This determination may be made by determining whether the individual definition information has been read in step S408 or S412. When the tree information does not represent the previous unique number or the next unique number as 'STANDBY' (No in step S410), the control unit 220 proceeds to a process of step S414. When the tree information represents the previous unique number or the next unique number as 'STANDBY' (Yes in step S410), the control unit 220 proceeds to a process of step S420.

In step S414, the control unit 220 reads the setting information stored in the setting information table shown in FIG. 12.

Step S414 will be described. The control unit 220 extracts the unique number included in the individual definition information having been read into the RAM in step S404, S408, or S412. Also, the control unit 220 reads the second mapping table shown in FIG. 11B, from the storage unit 230 into the RAM. Next, the control unit 220 determines whether any item corresponding to a unique number matching the extracted unique number is registered in the second mapping table. Then, when any item corresponding to the unique number corresponding to the extracted unique number is registered in the second mapping table, the control unit 220 specifies the item associated with the unique number in the second mapping table. Subsequently, the control unit 220 reads the setting information stored in association with the same item as the specified item in the setting information table. Meanwhile, when any item corresponding to the unique number matching the extracted unique number is not registered in the second mapping table, the control unit 220 does not read the setting information from the setting information table.

After executing step S414, in step S416, the control unit 220 adds a parameter matching the setting information read in step S414, to the individual definition information stored in the RAM. For example, when the individual definition information stored in the RAM is individual definition information having the unique number '007' (see FIG. 3G), in step S414, the control unit 220 specifies a thumbnail list of the image data and a data name list of the image data are specified as items. Then, setting information associated with those specified items is read from the setting information table. Referring to FIG. 12, the thumbnail list of the image data include a first thumbnail, a second thumbnail, a third thumbnail, a fourth thumbnail, and the like, and the data name list of the image data include a first file name, a second file name, a third file name, a fourth file name, and the like. Therefore, in step S416, the thumbnails and the file names are added as parameters for enabling the user of the multi-function device 100 to select the image data. Subsequently, in step S418, the control unit 220 controls the communication unit 210 to transmit the individual definition information stored in the RAM to the multi-function device 100. After executing step S418, the control unit 220 returns to the process of step S400, and repeatedly executes the main process.

In step S420, the control unit 220 stores that the 001 flag is 'OFF', in the RAM. Subsequently, in step S421, the control unit 220 controls the communication unit 210 to transmit a standby instruction to the multi-function device 100.

<GUI for Using Download Service>

Here, a configuration of a GUI for using a download service of the service A in the multi-function device 100 will be described with reference to FIGS. 3A to 3O.

In order to use the download service of the service A, the user touches an application start icon for instructing the relay server 200 to start the remote UI, displayed in the multi-function device 100 which is in the standby state, from the top screen. When doing so, in step S100, the multi-function device 100 transmits the application start request information to the relay server 200 without including any information specifying a device function in the application start request information.

When receiving the application start request information without any information specifying a device function, the relay server 200 transmits the individual definition information having the unique number '001' (see FIG. 3A) to the multi-function device 100.

When receiving the individual definition information having the unique number '001', the multi-function device 100 displays a list screen (not shown) for enabling the user to select whether to use an external service or a function of the multi-function device 100.

When the user selects the external service, the multi-function device 100 transmits the operation result information including the unique number '001', the key type representing the 'ENTER' key, and the determined information representing the external service, to the relay server 200.

When receiving the operation result information including the unique number '001', the key type representing the 'ENTER' key, and the determined information representing the external service, the relay server 200 transmits the individual definition information having the unique number '002' (see FIG. 3B) to the multi-function device 100 according to the tree information and the undetermined table.

When receiving the individual definition information having the unique number '002', the multi-function device 100 displays a list screen (not shown) for enabling the user to select Yes or No regarding whether the user wants to use the external service.

When the user selects Yes, the multi-function device 100 transmits operation result information, including the unique number '002', the key type representing the 'ENTER' key, and the determined information representing Yes, to the relay server 200.

When receiving operation result information, including the unique number '002', the key type representing the 'ENTER' key, and the determined information representing Yes, the relay server 200 transmits the individual definition information having the unique number '003' (see FIG. 3C) to the multi-function device 100 according to the tree information and the undetermined table.

When receiving the individual definition information having the unique number '003', the multi-function device 100 displays a list screen (not shown) for enabling the user to select an external service.

When the user selects the service A, the multi-function device 100 transmits operation result information, including the unique number '003', the key type representing the 'ENTER' key, and the determined information representing the service A, to the relay server 200.

When receiving the operation result information, including the unique number '003', the key type representing the 'ENTER' key, and the determined information representing the service A, the relay server 200 transmits the individual definition information having the unique number '004' (see FIG. 3D) to the multi-function device 100 according to the tree information and the undetermined table.

When receiving the individual definition information having the unique number '002', the multi-function device 100 displays a list screen (not shown) for enabling the user to select whether to use an upload service or download service of the service A.

When the user selects the download, the multi-function device 100 transmits operation result information, including the unique number '004', the key type representing the 'ENTER' key, and the determined information representing the download, to the relay server 200.

When receiving operation result information, including the unique number '004', the key type representing the 'ENTER' key, and the determined information representing the download, the relay server 200 transmits the individual definition information having the unique number '006' (see FIG. 3F) to the multi-function device 100 according to the tree information and the undetermined table.

When receiving the individual definition information having the unique number '006', the multi-function device 100 displays a list screen (not shown) for enabling the user to select whether to store the downloaded image data in a medium or to print the downloaded image data.

When the user selects to print the downloaded image data, the multi-function device 100 transmits operation result information, including the unique number '006', the key type representing the 'ENTER' key, and the determined information representing the printing, to the relay server 200.

When receiving the operation result information, including the unique number '006', the key type representing the 'ENTER' key, and the determined information representing the printing, the relay server 200 accesses the service providing server 300A for the service according to the tree information and the undetermined table. If communication with the service providing server 300A is normal, the relay server 200 acquires the thumbnails and data names of the image data stored in the service providing server 300A. Then, the relay server 200 transmits the individual definition information having the unique number '007' (see FIG. 3G) to the multi-function device 100. The individual definition information transmitted by the relay server 200 includes the thumbnails and data names of the image data stored in the service providing server 300. Meanwhile, if the communication with the service providing server 300A is erroneous, the relay server 200 transmits the individual definition information having the unique number '008' (see FIG. 3H) to the multi-function device 100.

When receiving the individual definition information having the unique number '007', the multi-function device 100 displays a list screen (see FIG. 4B) of the thumbnails of the image data for enabling the user to select image data to be downloaded.

When the user selects image data, the multi-function device 100 transmits individual definition information having the unique number '007', the key type representing the 'ENTER' key, and the determined information representing the data name of the image data selected by the user, to the relay server 200.

When receiving the individual definition information having the unique number '007', the key type representing the 'ENTER' key, and the determined information representing the data name of the image data selected by the user, the relay server 200 transmits the individual definition information having the unique number '009' (see FIG. 3I) to the multi-function device 100 according to the tree information and the undetermined table. The individual definition information transmitted by the relay server 200 includes the operation type representing that downloading will be executed, a parameter representing that the downloaded image data will be printed, and a parameter representing the data name of the image data selected by the user.

When receiving the individual definition information having the unique number '009', the multi-function device 100 downloads the image data of the data name included in the individual definition information, from the service providing server 300A, and prints the downloaded image data.

When the printing ends, the multi-function device 100 transmits the function operation end information including the unique number '009' to the relay server 200.

When receiving the function operation end information including the unique number '009', the relay server 200 transmits the standby instruction information to the multi-function device 100 in accordance the tree information.

When receiving the standby instruction information, the multi-function device 100 returns to the standby state.

On the other hand, when the receiving the individual definition information having the unique number '008', the multi-function device 100 displays a message screen (see FIG. 4C) for informing the user that the communication with the service providing server 300A has been erroneous.

When the user pushes the 'NEXT' key, the multi-function device 100 transmits operation result information including the unique number '008' and the key type representing the 'NEXT' key, to the relay server 200.

When receiving the operation result information including the unique number '008' and the key type representing the 'NEXT' key, the relay server 200 transmits the individual definition information having the unique number '003' (see FIG. 3C) to the multi-function device 100 according to the tree information.

As described above, the GUI for using the download service of the service A includes a basic configuration in which the relay server 200 transmits individual definition information to the multi-function device 100 according to the tree information and the undetermined table, and the multi-function device 100 displays various screens according to the individual definition information.

<GUI for Using Upload Service>

A configuration of a GUI for using an upload service of the service B in the multi-function device 100 will be described.

The GUI for using the upload service of the service B includes a basic configuration common to the GUI for using the download service of the service A.

When the user touches the application start icon for instructing the relay server 200 to start the remote UI from the top screen, in step S100, the multi-function device 100 transmits the application start request information to the relay server 200 without including any information specifying a device function in the application start request information. The processes from step S100 to a step in which the multi-function device 100 displays the list screen (see FIG. 4A) for enabling the user to select an external are common to the GUI for using the download service of the service A.

Hereinafter, the GUI for using the upload service of the service B will be described while the redundant description of the common basic configuration will not repeated.

When the user selects the service B, the multi-function device 100 transmits operation result information including the unique number '001', the key type representing the 'ENTER' key, and the determined information representing the service B, to the relay server 200.

When the relay server 200 having received the operation result information transmits the individual definition information having the unique number '005' (see FIG. 3E) to the multi-function device 100, the multi-function device 100 displays a message screen (not shown) for informing the user that the user will use the upload service of the service B.

When the user pushes the 'NEXT' key, the multi-function device 100 transmits operation result information including the unique number '005' and the key type representing the 'NEXT' key to the relay server 200.

When the relay server 200 having received the operation result information transmits the individual definition information having the unique number '010' (see FIG. 3J) to the multi-function device 100, the multi-function device 100 displays a list screen (not shown) for enabling the user to select whether to upload image data read from a medium or to upload image data obtained by scanning a document.

When the user selects the scanning, the multi-function device 100 transmits operation result information including the unique number '010', the key type representing the 'ENTER' key, and the determined information representing the scanning, to the relay server 200.

When receiving the operation result information, the relay server 200 transmits individual definition information, including the unique number '011' (see FIG. 3K), the operation type representing uploading, and a parameter representing image data obtained by scanning a document is to be uploaded, to the multi-function device 100. According to the received individual definition information, the multi-function device 100 acquires image data by scanning a document and uploads the acquired image data to the service providing server 300A.

<GUI for Using Copy Function>

A configuration of a GUI for using the copy function of the multi-function device 100 in the multi-function device 100 will be described.

The GUI for using copy function of the multi-function device 100 includes a basic configuration common to the GUI for using the download service of the service A.

When the user touches the application start icon for instructing the relay server 200 to start the remote UI from the top screen, in step S100, the multi-function device 100 transmits the application start request information to the relay server 200 without including any information specifying a device function in the application start request information. The processes from step S100 to a step in which the multi-function device 100 displays the list screen (not shown) for enabling the user to select to use an external service or a function of the multi-function device 100 are common to the GUI for using the download service of the service A.

Hereinafter, the GUI for using the copy function of the multi-function device 100 will be described while the redundant description of the common basic configuration will not repeated.

When the ser selects to use a function of the multi-function device 100, the multi-function device 100 transmits operation result information, including the unique number '001', the key type representing the 'ENTER' key, and the determined information representing use of a function of the multi-function device 100, to the relay server 200.

When the relay server 200 having received the operation result information transmits the individual definition information having the unique number '012' (see FIG. 3L) to the multi-function device 100, the multi-function device 100 displays a list screen (not shown) for enabling the user to select whether to use the scanning function or the copy function.

When the user selects the copy function, the multi-function device 100 transmits operation result information including the unique number '012', the key type representing the 'ENTER' key, and the determined information representing copying, to the relay server 200.

When the relay server 200 having received the operation result information transmits the individual definition information having the unique number '013' (see FIG. 3M) to the multi-function device 100, the multi-function device 100 displays an input box screen (see FIG. 4D) for inputting the copy resolution.

When the user inputs the copy resolution, the multi-function device 100 transmits operation result information including the unique number '013', the key type representing the 'ENTER' key, and the determined information representing the copy resolution, to the relay server 200.

When the relay server 200 having received the operation result information transmits the individual definition information having the unique number '014' (see FIG. 3N) to the multi-function device 100, the multi-function device 100 displays a message screen (not shown) for informing the user that the copy function will be used.

When the user selects Yes, the multi-function device 100 transmits operation result information, including the unique number '014', the key type representing the 'ENTER' key, and the determined information representing Yes, to the relay server 200.

When the relay server 200 having received operation result information transmits individual definition information, including the unique number '015' (see FIG. 3O), the operation type representing the copying, and the parameter representing the copy resolution, to the multi-function device 100, the multi-function device 100 copies a document at the copy resolution represented by the individual definition information.

<Another GUI for Using Copy Function>

In order to use the copy function, the user may touch the application start icon for instructing the relay server 200 to start the remote UI, displayed in the multi-function device 100 which is in the standby state, from a screen regarding the copy function. When doing so, in step S100, the multi-function device 100 transmits the application start request information with information specifying a device function included in the application start request information, to the relay server 200.

<Regarding Other GUIs>

In addition to the above-mentioned GUIs, the inventive concept of the present invention can be applied to a GUI for using a service of a new service providing server 300C (not shown), or a GUI for using the scanning function of the multi-function device 100.

According to the present illustrative embodiment, it is unnecessary to transmit and receive a large amount of image data such as bitmap data representing screens displayed on the display unit 150 of the multi-function device 100 between the multi-function device 100 and the relay server 200 through the network 400. Specifically, it is unnecessary to transmit and receive image data representing a basic screen according to the screen type and various keys included in an image to be displayed between the multi-function device 100 and the relay server 200. Therefore, it is possible to reduce a communication load between the devices in screen display. The multi-function device 100 does not need to manage screen transitions and the relay server 200 does not need to manage the image data representing the basic screen according to the screen type and various keys included in then image to be displayed. According to this configuration, when predetermined operation such as operation of the 'ENTER' key is performed in the multi-function device 100, the relay server 200 can efficiently make a screen transition according to the predetermined operation only by transmitting individual definition information for instructing the multi-function device 100. Particularly, even when a plurality of multi-function devices 100 (for example, a multi-function device 100 which is a touch panel model and a multi-function device 100 which is a non-touch-panel model), since the relay server 200 does not need to manage basic screens according to the screen types of the plurality of multi-function devices 100 and various keys on purpose, it is possible to instruct the plurality of multi-function devices 100 having different configurations according to common individual definition information.

Further, for example, it is assumed that, in addition to the service A and the service B, a service C is newly provided by the service providing server 300A, the service providing server 300B, or another service providing server. In this case, in order to make the service C selectable, in the screen shown in FIG. 4A, the service C should be included as a selection choice. With respect to this addition of a new selection choice, in the present illustrative embodiment, new individual definition information shown in FIG. 13 is generated by additionally describing the service C in the unique list information of the individual definition information shown in FIG. 3C, and is stored in the storage unit 230 of the relay server 200. An undetermined table shown in FIG. 14 is generated by adding a list of processes, which the service C provides, in the undetermined table shown in FIG. 10B, and is stored in the storage unit 230 of the relay server 200. Further, a setting information table shown in FIG. 15 is generated by adding a list item 'LIST OF PROCESSES WHICH SERVICE C PROVIDES' in the setting information table shown in FIG. 12, and is stored in the storage unit 230 of the relay server 200. The individual definition information with the service C added to the service A and the service B is obtained by adding information regarding the service C to information such as individual definition information stored in the storage unit 230, is transmitted from the relay server 200, and is received by the multi-function device 100. Then, a list including a selection choice representing the service C is displayed on the display unit 150 in the above-mentioned manner. Therefore, even when the multi-function device 100 has no image data representing the service C as a selection choice, it is possible to select the new service C. In other words, in the present illustrative embodiment, even if new image data for screen display is additionally stored, it is possible to cope with addition of the new service. Particularly, even when a plurality of multi-function devices 100 (for example, a multi-function device 100 which is a touch panel model and a multi-function device 100 which is a non-touch-panel model) exist in the system 1, new image data for screen display need not to be additionally stored in the plurality of multi-function devices 100, which is preferable.

Further, for example, it is assumed that the specification has been changed such that, when the user performs operation to select image data and operates the 'ENTER' key in the screen shown in FIG. 4B, a message 'DOWNLOAD START' is displayed, and then image data selected by the user is downloaded. In this case, for example, individual definition information, including an unique number '016', an instruction type representing an UI instruction, a screen type representing a message type, a title of 'DOWNLOAD SERVICE', information in which the 'ENTER' key is invalid, information in which the 'PREVIOUS' key is invalid, information in which the 'NEXT' key is valid, and unique message information representing 'DOWNLOAD START', is generated, and is stored in the storage unit 230 of the relay server 200. Also, the tree information shown in FIG. 10A, information representing the next individual definition information of the individual definition information including the unique number '007' is changed from '009' to '016', and information representing the unique number '009' is added as information representing the next individual definition information of the individual definition information including the unique number '016', so as to generate new tree information, and the new tree information is stored in the storage unit 230 of the relay server 200. Since the information regarding a message 'DOWNLOAD START' to information such as the individual definition information stored in the storage unit 230, when the user performs operation to select image data and operates the 'ENTER' key, the individual definition information having the unique number '016 is transmitted from the relay server 200 and is received by the multi-function device 100. Then, the message 'DOWNLOAD START' is displayed on the display unit 150 in the above-mentioned manner, and if the user operates the 'NEXT' key, the individual definition information having the unique number '009' is transmitted from the relay server 200 and is received by the multi-function device 100. In this manner, the download is executed. Therefore, since the information stored in the storage unit 230 of the relay server 200 is updated, even when the information stored in the multi-function device 100 is not updated, if the user performs operation to select image data, it possible to implement an UI for starting the download after the message 'DOWNLOAD START' is displayed. In other words, even when the information stored in the multi-function device 100 is not updated, it is possible to cope with a change in the specification of the UI. Particularly, even when a plurality of multi-function devices 100 (for example, a multi-function device 100 which is a touch panel model and a multi-function device 100 which is a non-touch-panel model) exist in the system 1, it becomes unnecessary to update the information stored in the plurality of multi-function devices 100, which is preferable.

<Modification(s)>

In the above description, an example in which the multi-function device 100 is configured to perform communication with the relay server 200 has been described. The above-mentioned processes executed by the relay server 200 may be executed by any one or both of the service providing servers 300A and 300B. In this case, the relay server 200 may be omitted.

The network 400 may be a network such as a LAN other than the Internet network. The data communication can use not only the HTTP/1.1 but also an HTTP other than the HTTP/1.1, a FTP or a unique protocol.

Figure 2:
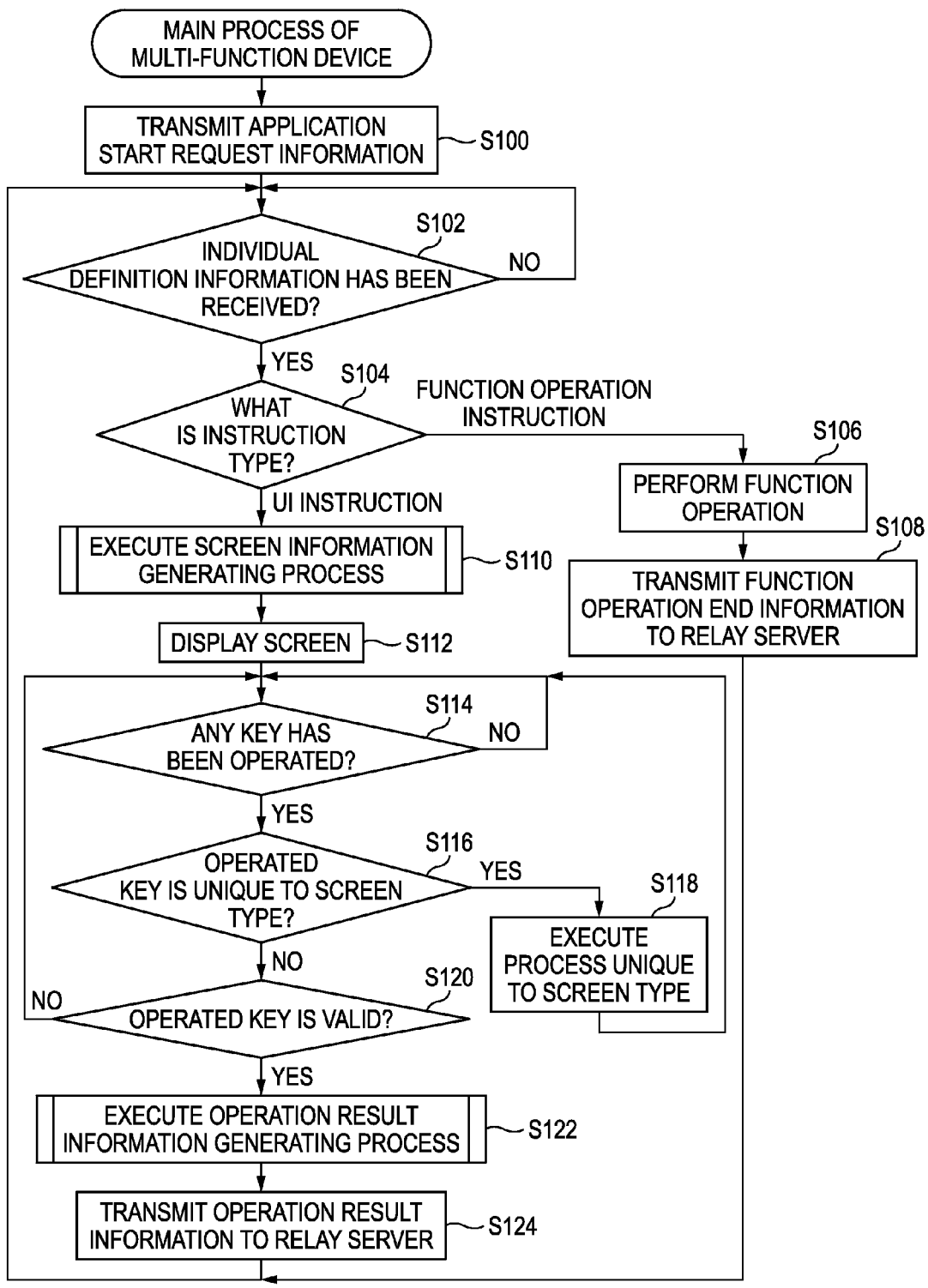
FIG. 2 is a flow chart illustrating a main process executed by the multi-function device.
Figure 5:
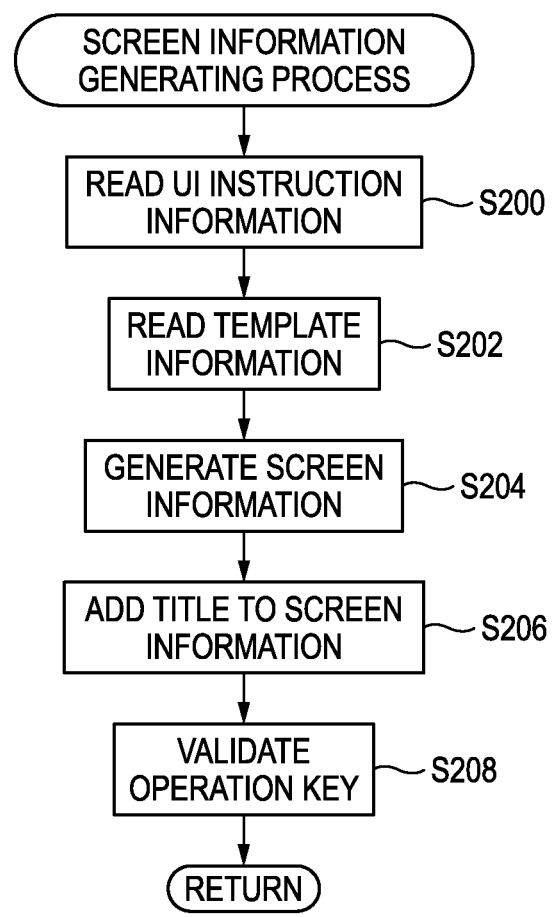
FIG. 5 is a flow chart illustrating an image information generating process executed in the main process of FIG. 2.

The multi-function device 100 may be configured such that the determination result in step S114 of the main process of the multi-function device 100 shown in FIG. 2 becomes positive (Yes in step S114) only when the operation key validated in the screen information generating process of step S208 shown in FIG. 5, that is, the key unique to the screen type is operated. For example, in a case of a touch panel model, a touch panel may be controlled such that, even when a position other than the position of the operation key validated in the screen information generating process of step S208 shown in FIG. 5, that is, the key unique to the screen type is touched, the touch is not detected. In a case of a non-touch-panel model, the operation unit 180 may be controlled such that, even when a hard key other than a hard key validated in step S208, the operation is not detected. In the case of the non-touch-panel model, the control unit 120 may instruct an audio output unit (not shown) to output a rejection tones when a hard key other than the hard key validated in step S208 is operated.

The multi-function device 100 having the printing function, the scanner function, a copy function, and the fax function has been exemplified; however, a device capable of using the configuration of the present illustrative embodiment may be another device different from the multi-function device 100. For example, office devices such as a printer, a scanner, a copy machine, and a facsimile, mobile terminals such as a portable phone, a PDA, and a head-mounted display, AV products such as a camera, a player, and a television set, home appliances such as a phone, a digital photo frame, a microwave, and a refrigerator, medical devices, and the like can employ the configuration of the present illustrative embodiment.

What is claimed is:

1. A system comprising:
a server; and
a plurality of terminal devices, in which the plurality of terminal devices and the server are connected to each other through a network,
wherein the terminal device comprises:
  a user interface including a plurality of operation points;
  a display;
  a plurality of function devices;
  a first controller;
  a first network interface; and
  a memory which stores plural pieces of screen type information, plural pieces of first display information, plural pieces of operation information, and plural pieces of operation point information,
wherein the screen type information is information indicative of a type of a screen displayed on the display,
wherein the first display information is information indicative of a first image included in the screen,
wherein any one of the plural pieces of the first display information is associated with each of the plural pieces of the screen type,
wherein the operation information is information indicative of user's operation which the terminal device can receive,
wherein the operation point information is information uniquely corresponding to the plurality of operation points of the user interface, and
wherein the any one of the plural pieces of operation point information is associated with each of the plural pieces of operation information,
wherein the server comprises:
  a second controller;
  a second network interface;
  a second memory which stores plural pieces of service use operation identification information, plural pieces of screen definition information and transition definition information,
wherein the service use operation identification information is information identifying a plurality of service use operation which the terminal device is caused to execute,
wherein the service use operation includes an execution of operation using the function devices, and an execution of communication with a service providing apparatus in connection with the execution of operation using the function devices,
wherein each of the plural pieces of screen definition information includes:
  one piece of screen identification information;
  the operation information associated with the one piece of screen identification information;
  the screen type information; and
  second display information,
wherein the screen identification information is information uniquely identifying a screen displayed on the terminal device,
wherein the second display information is information indicative of a second image included in the screen, the second image being different from the first image,
wherein the transition definition information is information which associates the operation information, associated with first screen identification information, with second screen identification information or the service use operation identification information,
wherein the second controller of the server receives request information from the terminal device through the second network interface,
wherein, in response to receiving the request information, the second controller of the server executes a servicer side process of:
  specifying particular screen identification information among the plural pieces of screen identification information by referring to the transition definition information, the particular screen identification information being screen identification information corresponding to the received request information; and
  transmitting, to the terminal device through the second network interface, reply information including the specified particular screen identification information, particular operation information, particular screen type information and particular second display information, wherein the particular operation information, the particular screen type information and the particular second display information are associated with the particular screen identification information;

wherein the first controller of the terminal device receives the reply information from the server through the first network interface, wherein in response to receiving the reply information, the first controller of the terminal device executes a terminal device side process of:

specifying particular first display information among the plural pieces of first display information stored in the first memory, the particular first display information being the first display information corresponding to the received particular screen type information;

generating screen information in which the first image identified by the specified particular first display information is combined with the second image identified by the received particular second display information;

specifying a particular operation point among the plurality of operation points of the user interface, the particular operation point being the operation point corresponding to the received particular operation information;

activating the specified particular operation point and deactivating the operation points other than the specified particular operation point;

displaying a screen identified by the generated screen information on the display; and when the particular operation point is operation after the screen is displayed and the particular operation point is activated, transmitting, to the server through the first network interface, new request information including the particular operation information corresponding to the operated particular operation point and the received particular screen identification information, wherein the second controller of the server receives the new request information through the second network interface from the terminal device after the second controller transmits the reply information, wherein when other screen identification information is associated by the transition definition information with the particular operation information which corresponds to the operated particular operation point and which is associated with the received particular screen identification information, the second controller of the server executes in the service side process:

setting the other screen identification information to new particular screen identification information;

referring to the screen definition information of the new particular screen identification information; and transmitting, through the second network interface to the terminal device which transmitted the new request information, the reply information including new particular screen identification information, new particular operation information, and new particular second display information, wherein the new particular operation information is the operation information associated with the new particular screen identification information, the new particular screen type information is the type information associated with the new particular screen identification information, and the new particular second display information is the second display information associated with the new particular screen identification information, wherein the first controller of the terminal device execute the terminal device side process according to the received new reply information in response to receiving the new reply information, wherein the second controller of the server executes:

transmitting through the second network interface to the terminal device which transmits the new request information, service use operation instruction information which instructs the terminal device to execute the service use operation identified by the service use operation identification information when the service use operation identification information is associated by the transition definition information with the particular operation information which corresponds to the operated particular operation point and which is associated with the received particular screen identification information, and wherein in response to receive the service use operation instruction information, the first controller of the terminal device executes:

operation using the function device, using the service use operation instruction information; and communicating with the service providing apparatus associated with the execution of the operation using the function device.

2. The system according to claim 1, wherein the network is the Internet, a plurality of the service providing apparatuses are connected to the Internet, the second memory of the server stores service providing apparatus screen selecting screen identification information of a service providing apparatus selecting screen, the service providing apparatus selecting screen being displayed on the terminal device and being a screen for selecting one of the service providing apparatuses, in the server side process, in a case that the service providing apparatus selecting screen selecting screen identification information is associated by the transition definition information with the particular operation information which corresponds to the operated particular operation point and which is associated with the particular screen identification information, the second controller of the server executes:

specifying the service providing apparatus selecting screen selecting screen identification information as new particular screen identification information, the service providing apparatus selecting screen selecting screen identification information being the screen identification information included in the screen definition information; and transmitting, through the second network interface to the terminal device which transmits the request information, the reply information including the service providing apparatus selecting screen selecting screen identification information, the first controller of the terminal device causes the display to display the service providing apparatus selecting screen in the terminal device process in response to receive the reply information including the service providing apparatus selecting screen selecting screen identification information, in the server side process, after the second controller of the server transmits the reply information including the service providing apparatus selecting screen selecting screen identification information as the new particular screen identification information, the second controller of the server executes:

requesting service use information necessary for the service use operation to a selected service providing apparatus through the second network interface, and receiving the replied service use information, the selected service providing apparatus being the service providing apparatus selected at the service providing apparatus selecting screen, and transmitting, through the second network interface to the terminal device which transmits the request information, the received service use information and the service use operation instruction information indicating execution of the service use operation, in response to receive the service use information and the service use operation instruction information from the server through the first network interface, the first controller of the terminal device executes communication instructed by the service use operation instruction information using the service use information with the service providing apparatus through the first network interface, and executes the operation instructed by the service use operation instruction information using the function device.

3. The system according to claim 1, wherein
the function device of the terminal device includes a printer,
the second memory of the server stores:
data selecting screen definition information of data selecting screen, the data selecting data selecting screen being a screen displayed on the terminal device and being a screen for selecting any of data stored in the service providing apparatus, and
the service use operation information of download printing, the download printing being the service use operation including download of the data stored in the service providing apparatus and print of the downloaded data by the printer,
in the server side process, in which the screen definition information of the data selecting screen identification information is associated by the transition definition information with the particular operation information which corresponds to the operated particular operation point and which is associated with the particular screen identification information, the second controller of the server executes:
specifying the data selecting screen identification information as new particular screen identification information, the data selecting screen identification information being the screen identification information included in the screen definition information, and
transmitting, through the second network interface to the terminal device which transmits the request information, the reply information including the data selecting screen identification information,
the first controller of the terminal device causes the display to display the data selecting screen in the terminal device side process in response to receiving the reply information including the data selecting screen identification information, in the server side process, after the controller transmits the reply information including the data selecting screen identification information, the second controller of the server transmits, through the second network interface to the terminal device which transmits the request information, data specifying information specifying selected data and service use operation instruction information instructing execution of the service use operation of the download print, the selected data being data selected at the data selecting screen,
in response to receiving through the first network interface from the server, the data specifying information and the service use operation instruction information instructing the execution of the service use operation of the download print, the first controller of the terminal device downloads the selected data specified by the data specifying information and print the downloaded selected data by the printer.

4. The system according to claim 1, wherein
the function device of the terminal device includes a document scanner configured to perform document scan,
the second memory of the server stores:
definition information of service use operation selecting screen, the service use operation selecting screen being a screen displayed on the terminal device and being the screen for selecting one of the service use operation, the service use operation including scanning-and-uploading which including scanning of the document by the document scanner and uploading the scanned data to the service providing apparatus; and
service use operation information of the scanning-and-uploading,
in the server side process, when the service use operation selecting screen identification information is associated by the transition definition information with the particular operation information which corresponds to the operated particular operation point and which is associated with the particular screen identification information, the second controller of the server executes:
specifying the service use operation selecting screen identification information as new particular screen identification information, the service use operation selecting screen identification information being the screen identification information included in the screen definition information; and
transmitting, through the second network interface to the terminal device which transmits the request information, the reply information including the serve use operation selecting screen identification information,
in response to receiving the reply information including the service use operation selecting screen identification information, the first controller of the terminal device causes the display to display the service use operation selecting screen in the terminal device side process,
in the service side process, after the second controller transmits the reply information including the service use operation selecting screen identification information, the second controller of the server transmits, through the second network interface to the terminal device which transmits the request information, the service use operation instruction information instructing execution of the service use operation of the scanning-and-uploading when the scanning-and-uploading is selected at the service use operation selecting screen,
in response to receiving the service use operation instruction information instructing the execution of the service use operation of the scanning-and-uploading through the first network interface from the server, the first controller of the terminal device causes the document scanner to scan the document and uploads a scan data to the service providing apparatus through the first network interface.

5. The system according to claim 1, wherein
the first image is an image representing a basic configuration of the screen, and
the second image is an image including at least one of a title of the screen, option, and a message.

6. The system according to claim 1, wherein
the plurality of terminal devices includes a first model of terminal device and a second model of terminal device,
the user interface of the first model of the terminal device includes a touch panel,
the touch panel is configured in such a manner that a plurality of software keys are arranged as the plurality of operation points,
in the terminal device side process, the first controller of the first model of the terminal device specifies the software key corresponding to the received particular operation information as the particular operation point,
the software key specified as the particular operation point is activated on the touch panel, and the software key which is not specified as the particular operation point is not activated,
the user interface of the second model of the terminal device includes a plurality of hardware keys,
in the terminal device side process, the first controller of the second model of the terminal device specifies the hardware key corresponding to the received particular operation information as the particular operation point,
the hardware key specified as the particular operation point is activated, and the hardware key which is not specified as the particular operation point is not activated.

7. A server configured to connect through a network to a plurality of terminal devices, which includes a plurality of function devices, the server comprising:
a controller;
a network interface;
a memory which stores plural pieces of service use operation identification information, upload, plural pieces of screen definition information, and transition definition information,
wherein the service use operation identification information is information identifying a plurality of service use operation which one of the terminal devices is caused to execute,
wherein the service use operation includes an execution of operation using the function devices and an execution of communication with a service providing apparatus in connection with the execution of operation using function devices,
wherein each of the plural pieces of screen definition information includes:
one piece of screen identification information;
operation information associated with the one piece of screen identification information;
screen type information; and
second display information,
wherein the screen identification information is information uniquely identifying a screen displayed on the terminal device,
wherein the second display information is information indicative of a second image included in the screen, the second image being different from the first image,
wherein the transition definition information is information which associates the operation information, associated with first screen identification information, with second screen identification information or the service use operation identification information,
wherein the controller receives request information from the terminal device through the network interface,
wherein, in response to receiving the request information, the controller executes a servicer side process of:
specifying particular screen identification information among the plural pieces of screen identification information by referring to the transition definition information, the particular screen identification information being screen identification information corresponding to the received request information; and
transmitting, to the terminal device through the network interface, reply information including the specified particular screen identification information, particular operation information, particular screen type information, and particular second display information, wherein the particular operation information, the particular screen type information, and the particular second display information are associated with the particular screen identification information;
wherein the controller receives new request information including the particular operation information corresponding to the operated particular operation point and the received particular screen identification information through the network interface from the terminal device after the controller transmits the reply information,
wherein when other screen identification information is associated by the transition definition information with the particular operation information which corresponds to a particular operation point and which is associated with the received particular screen identification information, the controller executes in the service side process:
setting the other screen identification information to new particular screen identification information;
referring to the screen definition information of the new particular screen identification information; and
transmitting, through the network interface to the terminal device which transmitted the new request information, the reply information including new particular screen identification information, new particular operation information, new particular screen type information, and new particular second display information, wherein the new particular operation information is the operation information associated with the new particular screen identification information, the new particular screen type information is the type information associated with the new particular screen identification information, and the new particular second display information is the second display information associated with the new particular screen identification information,
wherein the controller executes:
transmitting through the network interface to the terminal device which transmits the new request information, service use operation instruction information which instructs the terminal device to execute the service use operation identified by the service use operation identification information when the service use operation identification information is associated by the transition definition information with the particular operation information which corresponds to the operated particular operation point and which is associated with the received particular screen identification information.

8. The server according to claim 7, wherein
the network is the Internet,
a plurality of the service providing apparatuses are connected to the Internet,
the memory stores service providing apparatus screen selecting screen identification information of a service providing apparatus selecting screen, the service providing apparatus selecting screen being displayed on the terminal device and being a screen for selecting one of the service providing apparatuses,
in the server side process in a case that the service providing apparatus selecting screen selecting screen identification information is associated by the transition definition information with the particular operation information which corresponds to the operated particular operation point and which is associated with the particular screen identification information, the controller executes:
specifying the service providing apparatus selecting screen selecting screen identification information as new particular screen identification information, the service providing apparatus selecting screen selecting screen identification information being the screen identification information included in the screen definition information; and
transmitting, through the network interface to the terminal device which transmits the request information, the reply information including the service providing apparatus selecting screen selecting screen identification information,
in the server side process, after the controller transmits the reply information including the service providing apparatus selecting screen selecting screen identification information as the new particular screen identification information, the controller executes:
requesting service use information necessary for the service use operation to a selected service providing apparatus through the network interface, and receiving the replied service use information, the selected service providing apparatus being the service providing apparatus selected at the service providing apparatus selecting screen, and
transmitting, through the network interface to the terminal device which transmits the request information, the received service use information and the service use operation instruction information indicating execution of the service use operation.

9. The server according to claim 7, wherein
the plurality of function devices includes a printer,
the memory stores:
data selecting screen definition information of data selecting screen, the data selecting data selecting screen being a screen displayed on the terminal device and being a screen for selecting any of data stored in the service providing apparatus, and
the service use operation information of download printing, the download printing being the service use operation including download of the data stored in the service providing apparatus and print of the downloaded data by the printer,
in the server side process, in which the screen definition information of the data selecting screen identification information is associated by the transition definition information with the particular operation information which corresponds to the operated particular operation point and which is associated with the particular screen identification information, the controller executes:
specifying the data selecting screen identification information as new particular screen identification information, the data selecting screen identification information being the screen identification information included in the screen definition information, and
transmitting, through the network interface to the terminal device which transmits the request information, the reply information including the data selecting screen identification information,
in the server side process, after the controller transmits the reply information including the data selecting screen identification information, the controller transmits, through the network interface to the terminal device which transmits the request information, data specifying information specifying selected data and service use operation instruction information instructing execution of the service use operation of the download print, the selected data being data selected at the data selecting screen.

10. The server according to claim 7, wherein
the plurality of function devices includes a document scanner configured to perform document scan,
the memory stores:
definition information of service use operation selecting screen, the service use operation selecting screen being a screen displayed on the terminal device and being the screen for selecting one of the service use operation, the service use operation including scanning-and-uploading which including scanning of the document by the document scanner and uploading the scanned data to the service providing apparatus; and
service use operation information of the scanning-and-uploading,
in the server side process when the service use operation selecting screen identification information is associated by the transition definition information with the particular operation information which corresponds to the operated particular operation point and which is associated with the particular screen identification information, the controller executes:
specifying the service use operation selecting screen identification information as new particular screen identification information, the service use operation selecting screen identification information being the screen identification information included in the screen definition information, and
transmitting, through the network interface to the terminal device which transmits the request information, the reply information including the serve use operation selecting screen identification information,
in the service side process, after the controller transmits the reply information including the service use operation selecting screen identification information, the controller transmits, through the network interface to the terminal device which transmits the request information, the service use operation instruction information instructing execution of the service use operation of the scanning-and-uploading when the scanning-and-uploading is selected at the service use operation selecting screen.

11. The system according to claim 7, wherein
the first image is an image representing a basic configuration of the screen, and
the second image is an image including at least one of a title of the screen, option and a message.

12. A system including a terminal device configured to connect to a server through a network, the terminal device comprising:
- an user interface including a plurality of operation points;
- a display;
- a plurality of function devices;
- a controller;
- a network interface; and
- a memory which stores plural pieces of screen type information, plural pieces of first display information, plural pieces of operation information, and plural pieces of operation point information,
- wherein the screen type information is information indicative of a type of a screen displayed on the display,
- wherein the first display information is information indicative of a first image included in the screen,
- wherein any one of the plural pieces of the first display information is associated with each of the plural pieces of the screen type information,
- wherein the operation information is information indicative of user's operation which the terminal device can receive,
- wherein the operation point information is information uniquely corresponding to the plurality of operation points of the user interface, and
- wherein the any one of the plural pieces of operation point information is associated with each of the plural pieces of operation information,
- wherein the controller of the terminal device receives reply information including the specified particular screen identification information, particular operation information, particular screen type information and particular second display information from the server through the first network interface, wherein the particular operation information, the particular screen type information and the particular second display information are associated with particular screen identification information,
- wherein in response to receiving the reply information, the controller of the terminal device executes a terminal device side process of:
  - specifying particular first display information among the plural pieces of first display information stored in the memory, the particular first display information being the first display information corresponding to the received particular screen type information;
  - generating screen information in which the first image identified by the specified particular first display information is combined with the second image identified by the received particular second display information;
  - specifying a particular operation point among the plurality of operation points of the user interface, the particular operation point being the operation point corresponding to the received particular operation information;
  - activating the specified particular operation point and deactivating the operation points other than the specified particular operation point;
  - displaying a screen identified by the generated screen information on the display; and
  - when the particular operation point is operation after the screen is displayed and the particular operation point is activated, transmitting, to the server through the first network interface, new request information including the particular operation information corresponding to the operated particular operation point and the received particular screen identification information,
- wherein in response to receive service use operation instruction information, the controller of the terminal device executes:
  - operation using the function device, using the service use operation instruction information; and
  - communicating with the service providing apparatus associated with the execution of the operation using the function device.

13. The system according to claim 12, wherein the network is the Internet, a plurality of the service providing apparatuses are connected to the Internet, in response to receive service use information and service use operation instruction information from the server through the network interface, the controller executes communication instructed by the service use operation instruction information using the service use information with the service providing apparatus through the network interface, and executes the operation instructed by the service use operation instruction information using the function device.

14. The system according to claim 12, wherein the function device of the terminal device includes a printer, in response to receiving through the network interface from the server, data specifying information and service use operation instruction information instructing execution of service use operation of download print, the controller downloads selected data specified by the data specifying information and print the downloaded selected data by the printer.

15. The system according to claim 12, wherein the function device of the terminal device includes a document scanner configured to perform document scan, in response to receiving the reply information including the service use operation selecting screen identification information, the controller causes the display unit to display the service use operation selecting screen in the terminal device side process, in response to receiving the service use operation instruction information instructing the execution of the service use operation of the scanning-and-uploading through the network interface from the server, the controller causes the document scan unit to scan the document and uploads a scan data to the service providing apparatus through the first network interface.

16. The system according to claim 12, wherein the user interface includes a touch panel, the touch panel is configured in such a manner that a plurality of software keys are arranged as the plurality of operation points, in the terminal device side process, the controller specifies the software key corresponding to the received particular operation information as the particular operation point, the software key specified as the particular operation point is activated on the touch panel and the software key which is not specified as the particular operation point is not activated.

17. The system according to claim 12, wherein
the user interface includes a plurality of hardware keys,
in the terminal device side process, the controller specifies the hardware key corresponding to the received particular operation information as the particular operation point,
the hardware key specified as the particular operation point is activated, and the hardware key which is not specified as the particular operation point is not activated.

* * * * *